(12) United States Patent
Kabakian et al.

(10) Patent No.: US 12,259,466 B2
(45) Date of Patent: Mar. 25, 2025

(54) SYSTEM FOR EXTRACTION OF A REGION OF INTEREST (ROI) FROM A COMPOSITE SYNTHETIC APERTURE RADAR (SAR) SYSTEM PHASE HISTORY

(71) Applicant: The Boeing Company, Chicago, IL (US)

(72) Inventors: Adour Vahe Kabakian, Monterey Park, CA (US); David Wayne Payton, Malibu, CA (US); Brian N. Limketkai, Santa Monica, CA (US); Soheil Kolouri, Agoura Hills, CA (US); Qin Jiang, Malibu, CA (US)

(73) Assignee: The Boeing Company, Arlington, VA (US)

( * ) Notice: Subject to any disclaimer, the term of this patent is extended or adjusted under 35 U.S.C. 154(b) by 136 days.

(21) Appl. No.: 17/643,156

(22) Filed: Dec. 7, 2021

(65) Prior Publication Data

US 2022/0221578 A1    Jul. 14, 2022

Related U.S. Application Data

(60) Provisional application No. 63/135,550, filed on Jan. 8, 2021.

(51) Int. Cl.
   *G01S 13/90*    (2006.01)

(52) U.S. Cl.
   CPC ....... *G01S 13/9027* (2019.05); *G01S 13/9052* (2019.05); *G01S 13/9054* (2019.05); *G01S 13/9088* (2019.05)

(58) Field of Classification Search
   CPC ............. G01S 13/9027; G01S 13/9054; G01S 13/9052; G01S 13/9088; G01S 13/9011; G01S 13/9021; G01S 7/40; G01S 13/9029; G01S 13/9023; G01S 13/90; G01S 13/904; G01S 13/9035; G01S 13/9094; G01S 13/9005; G01S 13/9019
   See application file for complete search history.

(56) References Cited

U.S. PATENT DOCUMENTS 10,254,399 B1 *   4/2019   Simonson ........... G01S 13/9029
10,317,520 B2 *   6/2019   Capraro .................. G01S 13/90
(Continued)

OTHER PUBLICATIONS

Jiang Y, et al. Robust Automatic Target Recognition via HRRP Sequence Based on Scatterer Matching, Sensors 2018:18(2):593, Feb. 14, 2018.
(Continued)

*Primary Examiner* — Peter M Bythrow
*Assistant Examiner* — Nazra Nur Waheed
(74) *Attorney, Agent, or Firm* — Alleman Hall & Tuttle LLP

(57) ABSTRACT

Described is a method for extraction of a region of interest (ROI) from a composite synthetic aperture radar (SAR) phase history data. The method comprising receiving, with a system comprising a processor, the composite SAR phase history data of a plurality of backscattered return signals produced by a SAR system illuminating a scene with a SAR beam. The method also comprises obtaining a location of a first ROI within the scene and extracting from the composite SAR phase history data a first component SAR phase history data corresponding to the ROI at the location of the ROI.

20 Claims, 20 Drawing Sheets

(56) References Cited

U.S. PATENT DOCUMENTS

| | | | |
|---|---|---|---|
| 10,345,440 B1* | 7/2019 | West | G01S 13/9027 |
| 11,131,767 B2 | 9/2021 | Ni et al. | |
| 11,169,258 B2 | 11/2021 | Rao et al. | |
| 2007/0002138 A1* | 1/2007 | Oldroyd | G06T 17/05 |
| | | | 348/143 |
| 2018/0336693 A1* | 11/2018 | De Franchis | G01F 22/00 |
| 2021/0109209 A1* | 4/2021 | Li | G01S 13/9027 |
| 2021/0109210 A1 | 4/2021 | Kabakian et al. | |
| 2021/0231795 A1 | 7/2021 | Kolouri et al. | |
| 2021/0270959 A1 | 9/2021 | Jiang et al. | |

OTHER PUBLICATIONS

Du, Lan, et al. Radar Automatic Target Recognition Using Complex High-Resolution Range Profiles; Sonar & Navigation 1.1, 2007.
Otsu, N. A Threshold Selection Method From Gray-level Histograms; IEEE 9.1, 1979.
Wikipedia, Connected-Component labeling, Oct. 19, 2020 [retrieved on Dec. 7, 2021], https://web.archive.org/web/20201208073908/https://en.wikipedia.org/wiki/Connected-component_labeling 6 pages.
U.S. Appl. No. 63/135,553, The Boeing Company.
U.S. Appl. No. 17/456,345, The Boeing Company.

* cited by examiner

SYSTEM FOR EXTRACTION OF A REGION OF INTEREST (ROI) FROM A COMPOSITE SYNTHETIC APERTURE RADAR (SAR) SYSTEM PHASE HISTORY

CROSS-REFERENCE TO RELATED APPLICATIONS

This application claims the benefit of the filing date and right of priority under 35 U.S.C. § 119(e) of U.S. Provisional Patent Application No. 63/135,550 filed on Jan. 8, 2021, the disclosure of which is incorporated herein by reference in its entirety.

FIELD

The subject disclosure is related to Synthetic Aperture Radar (SAR) systems, and more particularly, for example, to systems and techniques for identifying and locating regions of interest within a SAR image.

BACKGROUND

Synthetic-aperture radar (SAR) systems are a form of radar used for remote sensing. SAR systems are generally utilized to create two-dimensional images or three-dimensional reconstructions of objects, such as landscapes or objects within a scene. SAR systems utilize the motion of the radar antenna over a target region (i.e., a SAR scene) to provide finer spatial resolution than conventional beam-scanning radars. Generally, the spatial resolution of radar data is directly related to the ratio of the sensor wavelength to the length of the sensor's antenna. For a given wavelength, the longer the antenna, the higher the spatial resolution.

SAR systems are typically mounted on a moving platform, such as an aircraft or spacecraft, and have their origins in an advanced form of side looking airborne radar (SLAR). The distance the SAR system travels over a target scene in the time taken for the radar pulses to return to the antenna creates the large synthetic antenna aperture the size of the antenna). Typically, the larger the aperture, the higher the image resolution will be, regardless of whether the aperture is physical (i.e., a large antenna) or synthetic (i.e., a moving antenna). As such, a SAR system creates high-resolution images with comparatively small physical antennas. Additionally, SAR systems have the property of having larger apertures for more distant objects, allowing consistent spatial resolution over a range of viewing distances.

Typically, specific Regions of Interest (ROIs) within the SAR scene, such as targets, are detected and located via image processing algorithms that are applied on an entire SAR image that is produced by the SAR system. Specifically, traditional SAR systems apply techniques developed in image processing for matching and registration of processed SAR images of the SAR scene to expected ground landmarks or objects within the SAR scene. In general, to achieve registration, image processing matching techniques typically attempt to detect salient features in each image, which can be tracked robustly though geometric transformations, such as image rotations, scaling, and translation. Unfortunately, compared to optical images, SAR images exhibit various types of noise, such as glint and multiplicative speckle, which reduce the reliability of salient feature detection, which, in turn, reduces the likelihood of successful matching. Known techniques to utilize noise mitigation methods reduce the noise effect, but also tend to soften and wash out the features exploited by the image matching processes. Moreover, these known attempts add additional layers of expensive computations, which makes them ill-suited for low size, weight, and power (SWaP) types of systems.

As such, in relation to low SWaP autonomous systems, contemporary SAR system methods require extensive processing and data resources for SAR image reconstruction and feature detection which can present several challenges for low SWaP type systems, such as for example for systems with limited computational power and resources.

Known approaches to reduce the computational complexity and reduce the processing time of detecting and locating targets within SAR scenes have included processing the phase histories of the return signals from SAR pulses directed at the SAR scene. Unfortunately, the return signal from a SAR pulse is an aggregate of the reflections from all targets and background features in a SAR scene illuminated by the SAR radar beam. As such, the phase histories of multiple targets in a scene are completely intermingled with each other as well as with the contributions from the entire background of a scene.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

Disclosed is a method for extraction of a region of interest (ROI) from a composite synthetic aperture radar (SAR) phase history data. The method comprises receiving, with a SAR system, the composite SAR phase history data of a plurality of backscattered return signals produced by the SAR system illuminating a scene with a SAR beam. The method also comprises obtaining a location of a first ROI within the scene and extracting from the composite SAR phase history data a first component SAR phase history data corresponding to the ROI.

Also disclosed is a SAR system for extraction of the ROI from the composite SAR phase history data. The SAR system comprises a memory, one or more processing units, and a machine-readable medium on the memory. The machine-readable medium stores instructions that, when executed by the one or more processing units, cause the SAR system to perform operations comprising: receiving the composite SAR phase history data of the plurality of backscattered return signals produced by the SAR system illuminating the scene with the SAR beam; obtaining the location of the first ROI within the scene; and extracting from the composite SAR phase history data the first component SAR phase history data corresponding to the ROI at the location of the ROI.

Additionally, disclosed is a method for fast ROI detection and localization with reduced SAR phase history data. The method comprises receiving the SAR phase history data of the plurality of backscattered return signals produced by the SAR system illuminating the scene with the SAR beam and creating, from the plurality of return signals, a pseudo-image of a radar beam sector via angular decomposition, wherein the radar beam sector is a sector of the SAR beam. The method also comprises detecting salient features of energy in the pseudo-image and detecting the ROI within the scene by generating a bounding ellipse around the detected salient features of energy.

Furthermore, disclosed is a SAR system for fast ROI detection and localization with reduced SAR phase history data. The SAR system comprises a memory, one or more processing units, and a machine-readable medium on the memory. The machine-readable medium stores instructions that, when executed by the one or more processing units, cause the SAR system to perform operations comprising: receiving the SAR phase history data of the plurality of backscattered return signals produced by the SAR system illuminating the scene with the SAR beam; creating, from the plurality of return signals, the pseudo-image of the radar beam sector via angular decomposition, wherein the radar beam sector is the sector of the SAR beam; detecting salient features of energy in the pseudo-image; and detecting the ROI within the scene by generating the bounding ellipse around the detected salient features of energy.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Systems and methods for extraction of a region of interest (ROI) from a composite synthetic aperture radar (SAR) phase history data are disclosed. The method comprises receiving, with a SAR system, the composite SAR phase history data of a plurality of backscattered return signals produced by the SAR system illuminating a scene with a SAR beam. The method also comprises obtaining a location of a first ROI within the scene and extracting from the composite SAR phase history data a first component SAR phase history data corresponding to the ROI.

Also disclosed is a SAR system for extraction of the ROI from the composite SAR phase history data. The SAR system comprises a memory, one or more processing units, and a machine-readable medium on the memory. The machine-readable medium stores instructions that, when executed by the one or more processing units, cause the SAR system to perform operations comprising: receiving the composite SAR phase history data of the plurality of backscattered return signals produced by the SAR system illuminating the scene with the SAR beam; obtaining the location of the first ROI within the scene; and extracting from the composite SAR phase history data the first component SAR phase history data corresponding to the ROI at the location of the ROI.

Additionally, disclosed is a method for fast ROI detection and localization with reduced SAR phase history data. The method comprises receiving the SAR phase history data of the plurality of backscattered return signals produced by the SAR system illuminating the scene with the SAR beam and creating, from the plurality of return signals, a pseudo-image of a radar beam sector via angular decomposition, wherein the radar beam sector is a sector of the SAR beam. The method also comprises detecting salient features of energy in the pseudo-image and detecting the ROI within the scene by generating a bounding ellipse around the detected salient features of energy.

Furthermore, disclosed is a SAR system for fast ROI detection and localization with reduced SAR phase history data. The SAR system comprises a memory, one or more processing units, and a machine-readable medium on the memory. The machine-readable medium stores instructions that, when executed by the one or more processing units, cause the SAR system to perform operations comprising: receiving the SAR phase history data of the plurality of backscattered return signals produced by the SAR system illuminating the scene with the SAR beam; creating, from the plurality of return signals, the pseudo-image of the radar beam sector via angular decomposition, wherein the radar beam sector is the sector of the SAR beam; detecting salient features of energy in the pseudo-image; and detecting the ROI within the scene by generating the bounding ellipse around the detected salient features of energy.

Extraction of an ROI from a Composite SAR Phase History Data

Figure 1A:
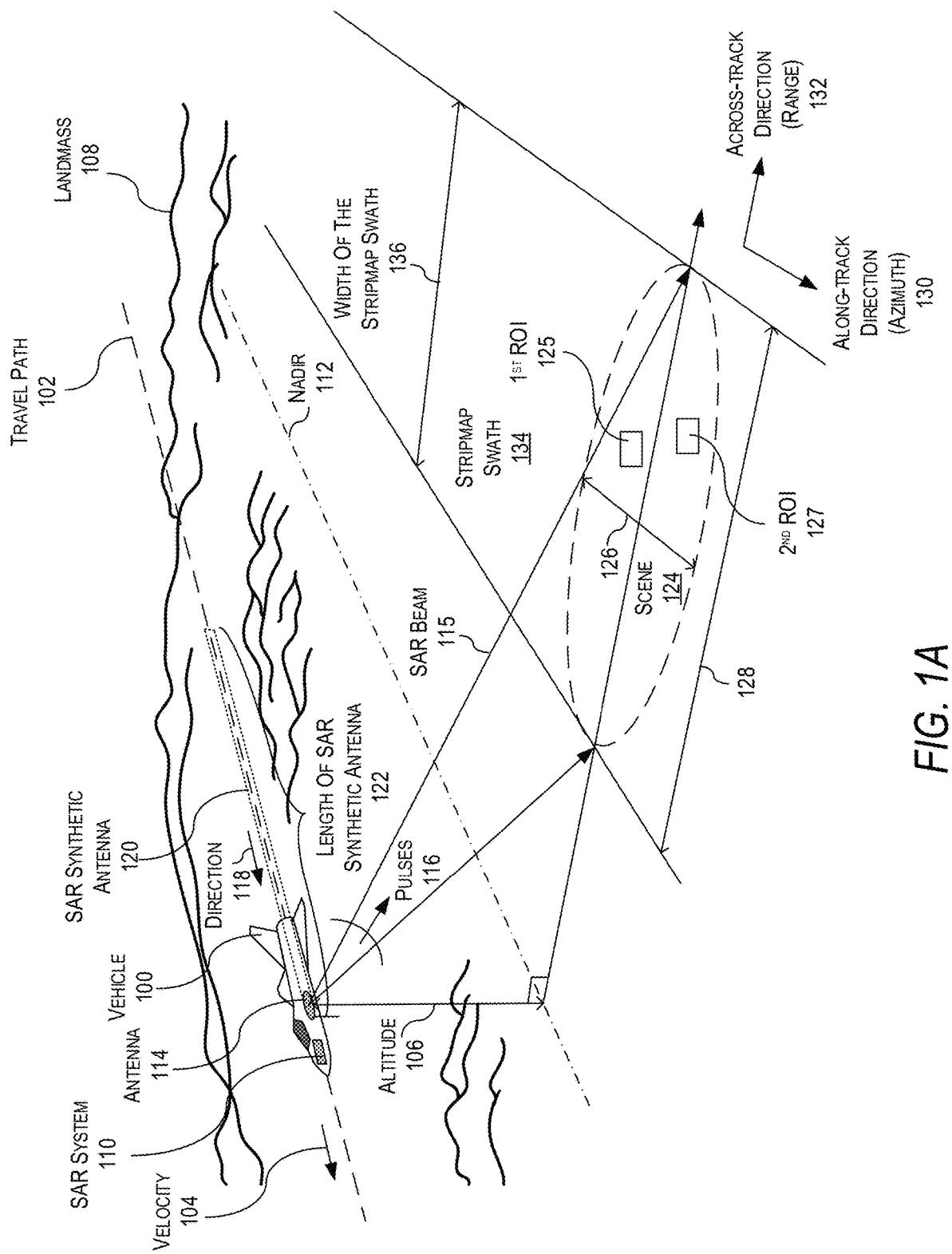
FIG. 1A is a perspective view of a diagram of an example of an implementation of a Synthetic Aperture Radar (SAR) system in a vehicle flying a course along a flight path over a landmass in accordance with the subject disclosure.

Turning to FIG. 1A, a perspective view of a diagram of an example of an implementation of a SAR system in a vehicle 100 in a stripmap mode flying along a straight flight path (i.e., travel path 102) with a constant velocity 104 and at a constant altitude 106 over a landmass 108 in accordance with the subject disclosure. The vehicle 100 (also known as a platform) can be, for example, a manned or unmanned aircraft such as an airplane, a drone, a spacecraft, a rotorcraft, or other type of unmanned or manned vehicle. The vehicle 100 flies along the travel path 102 at the constant altitude 106 such that a SAR system 110 (on the vehicle 100) is directly above a nadir 112. In this example, the nadir 112 is a locus of points on the surface of the Earth (e.g., the landmass 108) directly below an antenna 114 of the SAR system 110. It is appreciated by those of ordinary skill in the art that in radar systems the nadir 112 is the beginning of the range parameter of a SAR radar.

In an example of operation, the SAR system 110 radiates (e.g., transmits) SAR radar signal pulses 116 obliquely at an approximate normal (e.g., a right angle) direction to a direction 118 of the flight along the travel path 102. The SAR radar signal pulses 116 are electromagnetic waves that are sequentially transmitted from the antenna 114, which is a "real" physical antenna located on the vehicle 100. As an example, the SAR radar signal pulses 116 can be linear frequency modulated chip signals.

The antenna 114 is fixed and directed (e.g., aimed) outward from a side of the vehicle 100 at an obliquely and approximately normal direction to the side of the vehicle 100. The antenna 114 has a relatively small aperture size with a correspondingly small antenna length. As the vehicle 100 moves along the travel path 102, the SAR system 110 synthesizes a SAR synthetic antenna 120 that has a synthesized length 122 that is much longer than the length of the real antenna 114. It is appreciated by those of ordinary skill in the art that the antenna 114 can optionally be directed in a non-normal direction from the side of the vehicle 100. In this example, the angle at which the fixed antenna 114 is aimed away from the side of the vehicle 100 (and resultingly the travel path 102) will be geometrically compensated in the computations of the SAR system 110.

As the SAR radar signal pulses 116 hit the landmass 108 they illuminate an observed scene 124 (also referred to as a "footprint," "parch," or "area") of the landmass 108 and scatter (e.g., reflect off the landmass 108). In this example, the scene 124 can include one or more ROIs within the scene 124 such as, for example, first ROI 125 and second ROI 127. The illuminated scene 124 corresponds to a width 126 and 128 of the main beam of the real antenna 114 in an along-track direction 130 and across-track direction 132 as the main beam intercepts the landmass 108. In this example, the along-track direction 130 is parallel to the direction 118 of the travel path 102 of the vehicle 100 and it represents the azimuth dimension for the SAR system 110. Similarly, the across-track direction 132 is perpendicular (e.g., normal) to the travel path 102 of the vehicle 100 and it represents the range dimension of the SAR system 110. As the vehicle 100 travels along the travel path 102, the illuminated scene 124 defines a stripmap swath 134, having a swath width 136, which is a strip along the surface of the landmass 108 that has been illuminated by the illuminated scene 124 produced by the main beam of the antenna 114. In general, the length 122 of the SAR synthetic antenna 120 is directly proportional to the range 132 in that as the range 132 increases, the length 122 of the SAR synthetic antenna 120 increases.

Figure 1B:
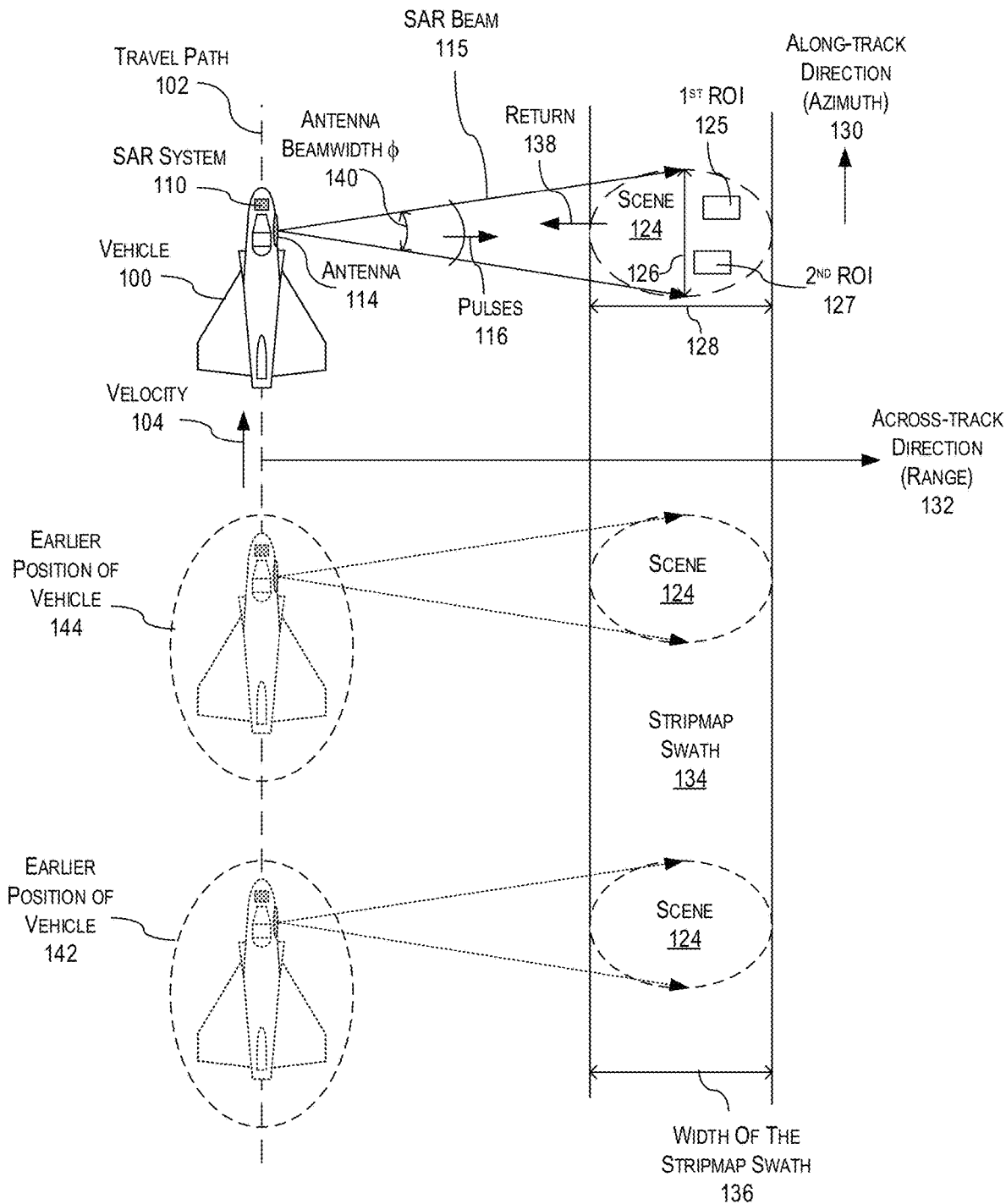
FIG. 1B is a top view of the SAR system in the vehicle shown in FIG. 1A in accordance with the subject disclosure.

In FIG. 1B, a top view of the SAR system 110 in the vehicle 100 is shown in accordance with the subject disclosure. Again, the vehicle 100 is shown flying along the straight travel path 102 with a constant velocity 104. In operation, as the vehicle 100 flies along the travel path 102, the SAR system 110, through the antenna 114, radiates, within a SAR beam 115, the SAR radar signal pulses 116 at the ground (e.g., landmass 108) at an approximately normal direction from the travel path 102 (and the along-track direction 130) where the SAR radar signal pulses 116 illuminate the scene 124 of the landmass 108 and scatter. The scatter off the scene 124 produces at least backscatter waves that are radar return signals 138 (i.e., backscattered return signals) that have reflected off the landmass 108 and reflected back towards the antenna 114. The antenna 114 receives the radar return signals 138 and passes them to the SAR system 110 that processes the radar return signals 138. In this example, the processing can include recording and storing the radar return signals 138 in a storage (not shown) in a data grid structure. The SAR system 110 utilizes consecutive time intervals of radar transmission and reception to receive radar phase history data of the illuminated and observed scene (e.g., scene 124) at different positions along the travel path 102. Normally, the processing the combination of raw radar data (e.g., radar phase history data of illuminated scene) enables the construction of a SAR image (e.g., a high-resolution SAR image) of the captured scene (e.g., scene 124). However, the disclosed SAR system 110 obviates the need for the construction of SAR images in order to perform a navigation task, instead, the SAR system 110 estimates the geometric transformation parameters directly from the range profiles of the received phase history data and phase history template data.

In this example, the widths 126 and 128 of the main beam of the antenna 114 are related to the antenna beamwidth φ 140 of the main beam produced by the antenna 114. Additionally, in this example, the vehicle 100 is shown to have traveled along the travel path 102 scanning the stripmap swath 134 at different positions along the travel path 102, where, as an example, the SAR system 110 is shown to have scanned two earlier scenes 142 and 144 the stripmap swath 134 at two earlier positions 146 and 148 along the travel path 102.

It is appreciated by those of ordinary skill in the art that while the example vehicle 100 shown in FIGS. 1A and 1B is a manned aircraft, this is for illustrative purpose only and the vehicle 100 can also be an unmanned aircraft such as an unmanned aerial vehicle (UAV) or drone.

Figure 1D:
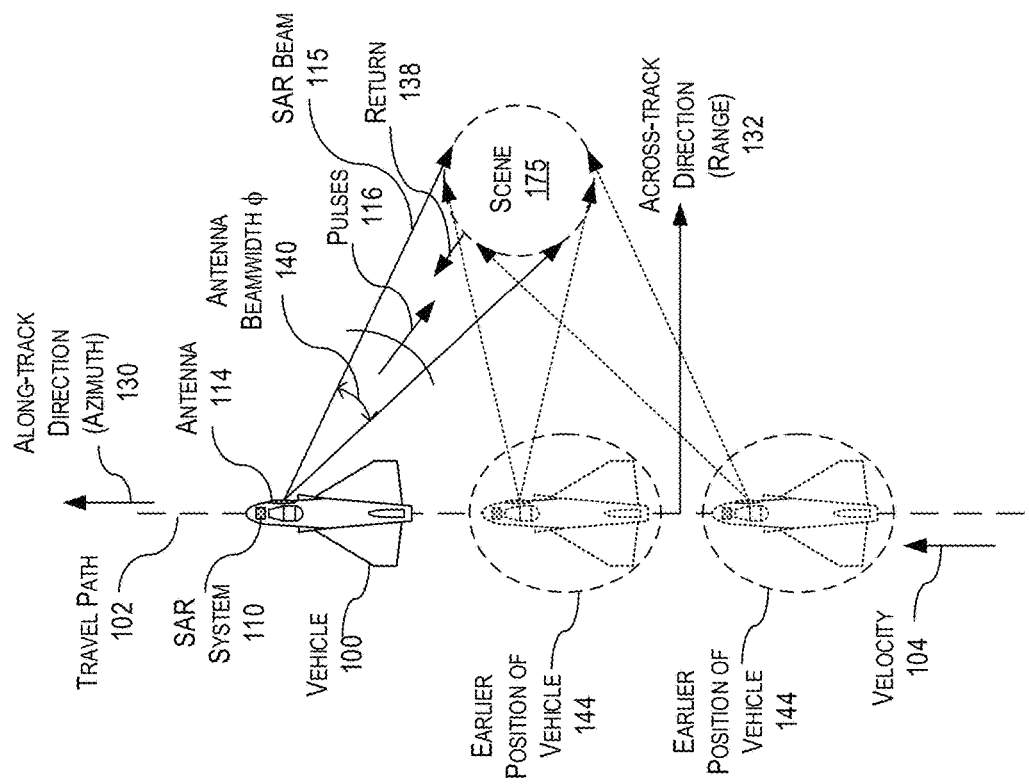
FIG. 1D is a top view of the SAR system operating in a spotlight mode in the vehicle shown in FIG. 1A in accordance with the subject disclosure.
Figure 1C:
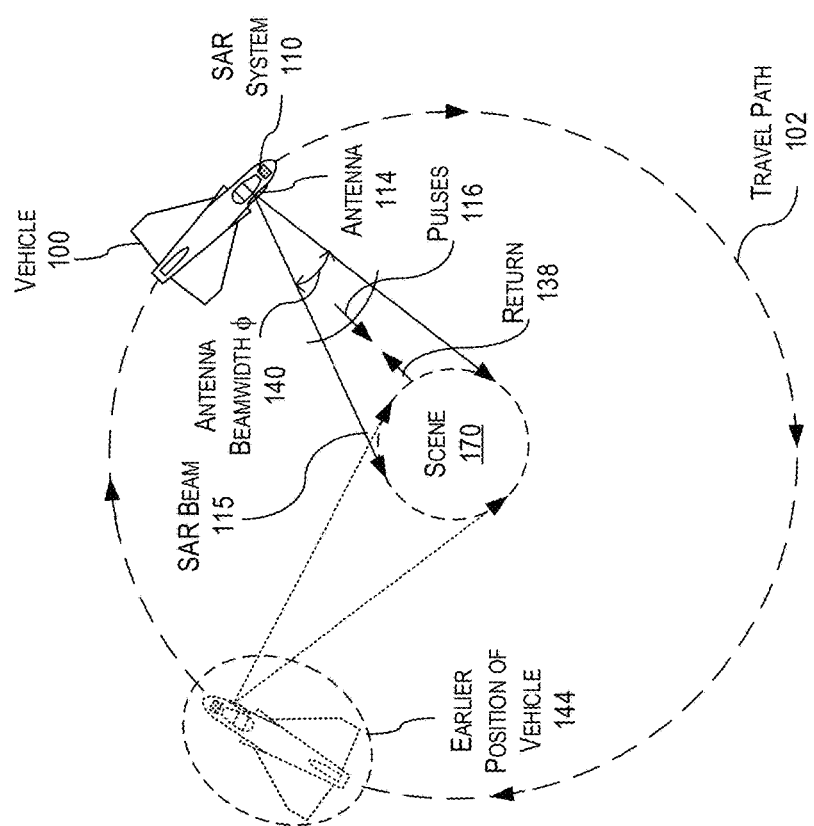
FIG. 1C is a top view of the SAR system operating in a circular mode in the vehicle shown in FIG. 1A in accordance with the subject disclosure.

In FIG. 1C, a top view of the SAR system 110 operating in a circular mode in the vehicle 100 is shown in accordance with the subject disclosure. In this example, the travel path 102 is a circular path and the SAR system 110 illuminates a circular scene 170. Turning to FIG. 1D, a top view of the SAR system 110 operating in a spotlight mode in the vehicle 100 is shown in accordance with the subject disclosure. In this example, the travel path 102 is straight similar to the example shown in FIG. 1A and the SAR system 110 illuminates another circular scene 175. It is appreciated by those of ordinary skill in the art that the scene 170 in FIG. 1C and scene 175 in FIG. 1D can each include one or more ROI, however, for the purpose of ease of illustration the one or more ROIs are not shown in these figures.

Figure 2:
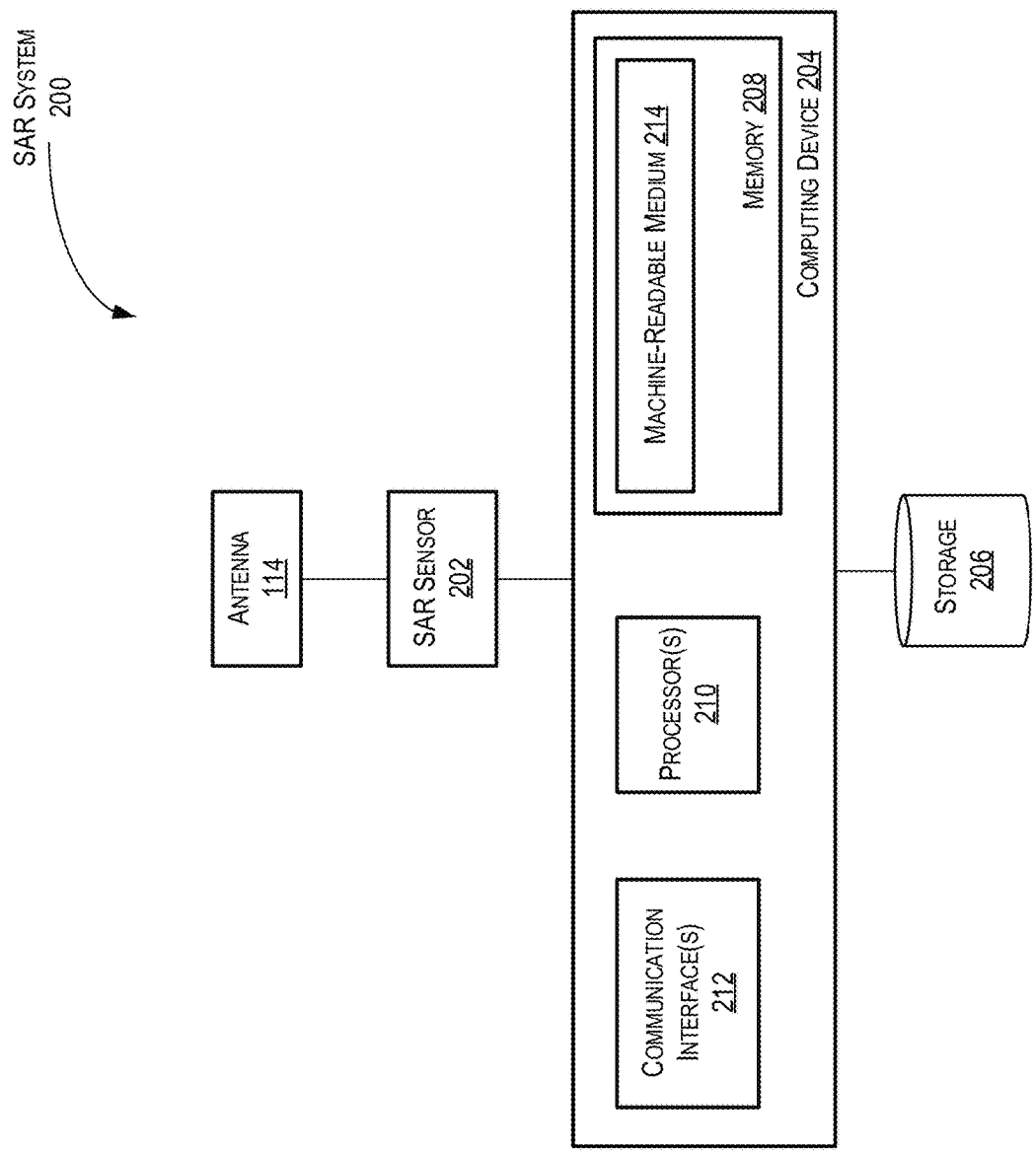
FIG. 2 is a system block diagram of an example of an implementation of the SAR system, shown in FIGS. 1A and 1B, in accordance with the subject disclosure.

In FIG. 2, a system block diagram of an example of an implementation of the SAR system 110 is shown in accordance with the subject disclosure. The SAR system can be configured to extract an ROI from a composite SAR phase history data and/or quickly detect and localize the ROI with reduced SAR phase history data. In this example, the SAR system 110 includes the antenna 114, a SAR sensor 202, a computing device 204, and a storage 206. The computing device 204 includes a memory 208, one or more processing units 210, and a one or more communication interfaces 212. In this example, the machine-readable medium 214 is on the memory 208 and stores instructions that, when executed by the one or more processing units 210, cause the SAR system 110 to perform various operations. In the case of extracting an ROI (either first ROI 125 or second ROI 127) from a composite SAR phase history data, these operations comprise: receiving the composite SAR phase history data of a plurality of backscattered return signals produced by the SAR system 110 illuminating the scene (i.e., scene 124, 170, or 175) with the SAR beam 115; obtaining a location of a first ROI 125 within the scene; and extracting from the composite SAR phase history data a first component SAR phase history data corresponding to the first ROI 125 at the location of the first ROI 125.

In the case of quickly detecting and localizing the ROI with a reduced SAR phase data, the SAR system 110 can alternatively or in addition include operations that comprise: receiving the SAR phase history data of a plurality of the backscattered return signals (i.e., return signals 138) produced by the SAR system 110 illuminating the scene (e.g., scene 124, 170, or 175) with the SAR beam 115; creating, from the plurality of return signals 138, a pseudo-image of a radar beam sector via angular decomposition, wherein the radar beam sector is a sector of the SAR beam 115; detecting salient features of energy in the pseudo-image; and detecting the ROI (either the first ROI 125 or second ROI 127) within the scene (e.g., scene 124, 170, or 175) by generating a bounding ellipse around the detected salient features of energy.

In general, the SAR system 110 is utilized to capture and process phase history data from observation views, of the scene 124, 170, or 175 in the swath 134, in accordance with various techniques described in the subject disclosure. The SAR system 110 is generally a SAR navigation guidance system that comprises a SAR radar device that transmits and receives electromagnetic radiation and provides representative data in the form of raw radar phase history data. As an example, the SAR system 110 is implemented to transmit and receive radar energy pulses in one or more frequency ranges from less than one gigahertz to greater than sixteen gigahertz based on a given application for the SAR system 110.

In this example, the computing device 204 includes that one or more processing units 210 that include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory 208 to execute instructions to perform any of the various operations described in the subject disclosure. The one or more processing units 210 are adapted to interface and communicate with the memory 208 and SAR sensor 202 via the one or more communication interfaces 212 to perform method and processing steps as described herein. The one or more communication interfaces 212 include wired or wireless communication buses within the vehicle 100.

In various examples, it is appreciated by those of ordinary skill in the art that the processing operations and/or instructions are integrated in software and/or hardware as part of the one or more processing units 210, or code (e.g., software or configuration data), which is stored in the memory 208. The examples of processing operations and/or instructions disclosed in the subject disclosure are stored by the machine-readable medium 213 in a non-transitory manner (e.g., a memory 208, a hard drive, a compact disk, a digital video disk, or a flash memory) to be executed by the one or more processing units 210 (e.g., a computer such as a logic or processor-based system) to perform various methods disclosed herein. In this example, the machine-readable medium 214 is shown as residing in memory 208 within the computing devices 204 but it is appreciated by those of ordinary skill that the machine-readable medium 214 can be located on other memory external to the computing device 204, such as for example, the storage 206. As another example, the machine-readable medium 213 can be included as part of the one or more processing units 210.

In this example, the memory 208 can include one or more memory devices (e.g., one or more memories) to store data and information. The one or more memory devices can include various types of memory including volatile and non-volatile memory devices, such as RAM (Random Access Memory), ROM (Read-Only Memory), EEPROM (Electrically-Erasable Read-Only Memory), flash memory, or other types of memory. The memory 208 can include one or more memory devices within the computing device 204 and/or one or more memory devices located external to the computing device 204. The one or more processing units 210 are adapted to execute software stored in the memory 208 to perform various methods, processes, and operations in a manner as described herein. In this example, the memory 208 stores the received phase history data of a scene 124 and/or phase history template data of the same scene 124.

The SAR sensor 202 is utilized to transmit electromagnetic waves (e.g., SAR radar signal pulses 116) and receive backscattered waves (e.g., received phase history data from the radar return signals 138) of scene 124, 170, or 175. In this example, the SAR sensor 202 includes a radar transmitter to produce the SAR radar signal pulses 116 that are provided to an antenna 114 and radiated in space toward scene 124, 170, or 175 by antenna 114 as electromagnetic waves. The SAR sensor 202 further includes a radar receiver to receive backscattered waves (e.g., radar return signals 138) from antenna 114. The radar return signals 138 are received by SAR sensor 202 as received phase history data of the scene 124, 170, or 175. The SAR sensor 202 communicates the received phase history data to the one or more processing units 210 and/or memory 208 via the one or more communication interfaces 212.

The antenna 114 is implemented to both transmit electromagnetic waves (e.g., SAR radar signal pulses 116) and receive backscattered waves (e.g., radar return signals 138). In this example, the antenna 114 is in a fixed position on the vehicle 100 and is directed outward from the side of the vehicle 100 since the SAR system 110 is operating as a side-looking radar system. The antenna 114 can be implemented as phased-array antenna, horn type of antenna, parabolic antenna, or other type of antenna with high directivity.

The storage 206 can be a memory such as, for example, volatile and non-volatile memory devices, such as RAM, ROM, EEPROM, flash memory, or other types of memory, or a removable storage device such as, for example, hard drive, a compact disk, a digital video disk. The storage 206 can be utilized to store template range profile data of the scenes.

Figure 3:
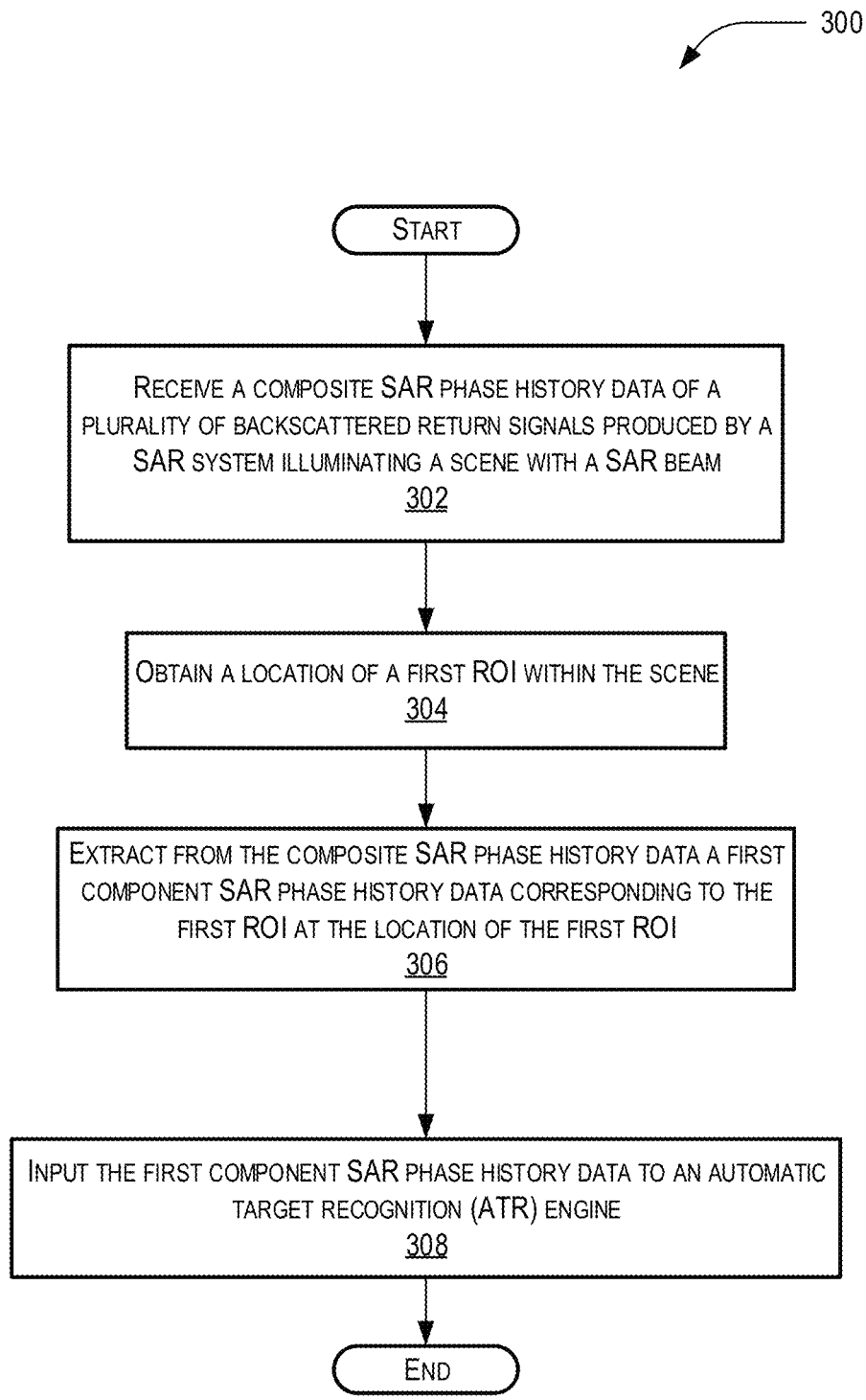
FIG. 3 is a flowchart of an example of an implementation of a method performed by the SAR system, shown in FIG. 2, in accordance with the subject disclosure.

In FIG. 3, a flowchart is shown of an example of an implementation of the method 300 performed by the SAR system 110 in accordance with the subject disclosure. The method 300 begins by receiving 302 a composite SAR phase history data of the plurality of backscattered return signals 138 produced by the SAR system 110 illuminating a scene with the SAR beam 115.

The composite SAR phase history data is received by the one or more processing units 210 of the computing device 204, where, in this example, the composite SAR phase history data is first received by the SAR sensor 202, via the antenna 114, and communicated to the one or more processing units 210 via the one or more communication interfaces 212. The composite SAR phase history data comprises information captured via the SAR system 110 that can be operating in a stripmap mode, circular mode, or spotlight mode.

Once received, the method 300 then obtains 304 a location of the first ROI 125 within the scene 124, 170, or 175. The location of the first ROI 125 can include obtaining the location of the first ROI 125 via global positioning system (GPS) coordinates, a ground spotter, and/or a targeting system. Alternatively, the location of the first ROI 125 can be obtained by performing a sub-method that includes: creating, from the first component SAR phase history data, a pseudo-image of the scene; detecting salient features of energy in the pseudo-image; and detecting the first ROI within the scene by generating a bounding ellipse around the detected salient features of energy.

The method 300 then extracts 306 from the composite SAR phase history data a first component SAR phase history data corresponding to the first ROI 125 at the location of the first ROI 125. Once the first component SAR phase history data is extracted, the method 300 then inputs 308 the first component SAR phase history data to an automatic target recognition (ATR) engine.

Figure 4:
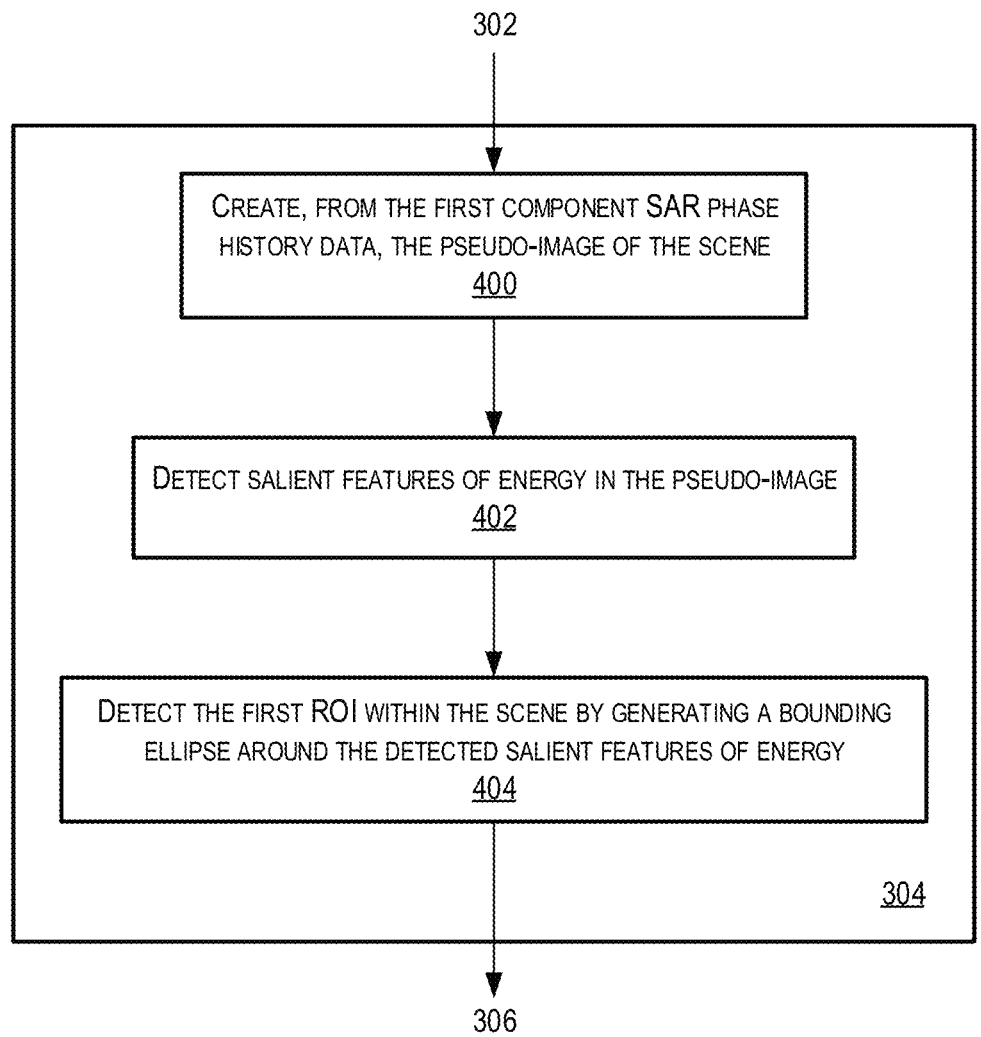
FIG. 4 is a flowchart of an example of an implementation of a method performed by the SAR system in detecting and obtaining the location of a first region of interest (ROI) described in FIG. 3 in accordance with subject disclosure.

In FIG. 4, a flowchart is shown of an example of an implementation of a sub-method of step 304 performed by the SAR system 110 in detecting and obtaining the location of the first ROI 125 described in FIG. 3 in accordance with subject disclosure. The sub-method of step 304 includes creating 400, from the first component SAR phase history data, the pseudo-image of the scene and detecting 402 salient features of energy in the pseudo-image. The sub-method then includes detecting 404 the first ROI within the scene 124, 170, or 175 by generating a bounding ellipse around the detected salient features of energy.

In this example, the step of detecting 402 salient features includes adaptive thresholding the pseudo-image to produce a binary image and identifying an object in the binary image utilizing morphological operations with connected component labeling. The adaptive thresholding includes size thresholding to exclude small artifacts in the binary image. Moreover, identifying objects further includes generating, after connected component labeling, a centroid, a major axis, a minor axis, and an orientation of the object. The centroid, major axis, minor axis, and orientation of the object defines the bounding ellipse around the object. In this example, detecting the first ROI 125 within the scene 124, 170, or 175 includes mapping an ellipse range value and ellipse angle value of the bounding ellipse to the scene 124, 170, or 175. Obtaining the location of the first ROI 125 further includes determining the location of the first ROI 125 from the ellipse range value and ellipse angle value.

Figure 5:
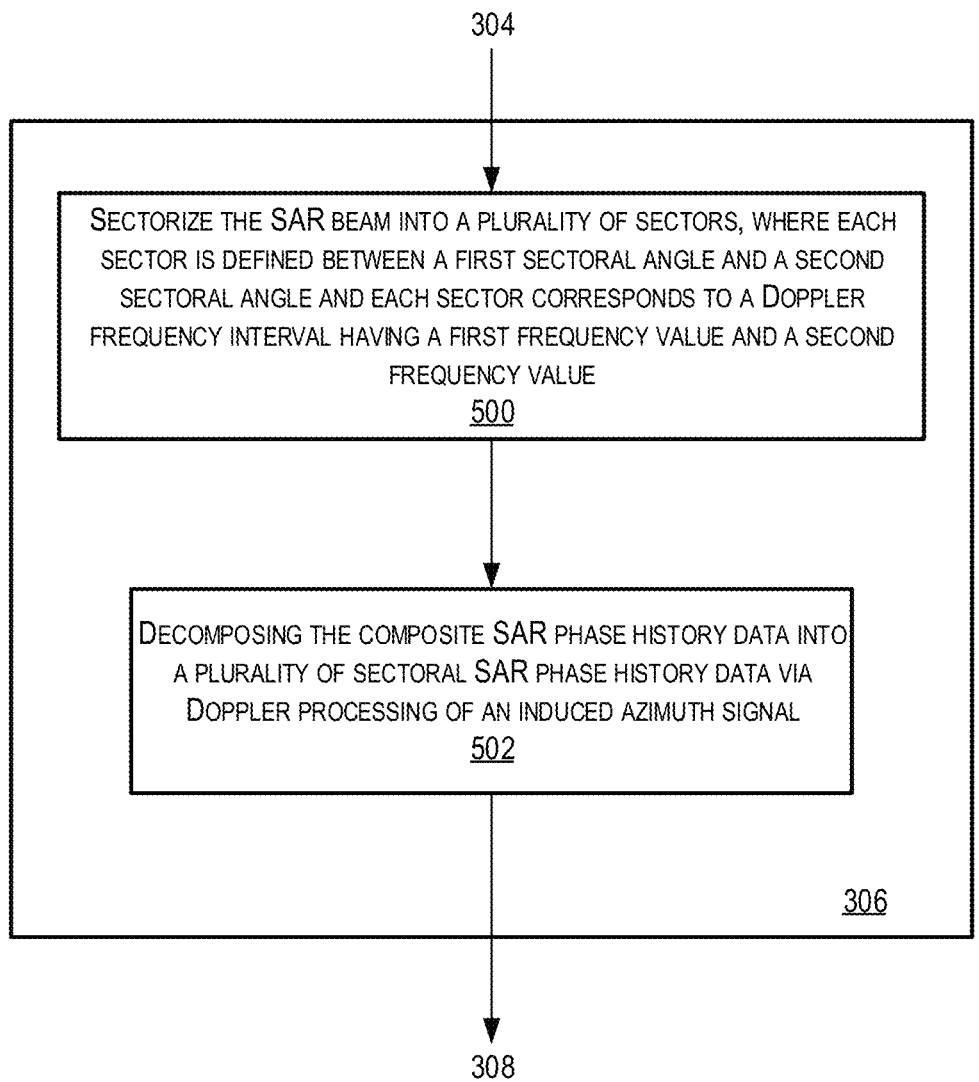
FIG. 5 is a system diagram of an example of an implementation of a data storage structure, of the SAR system shown in FIG. 2, for radar return signals from successive transmitted SAR radar signal pulses in accordance with the subject disclosure.

In FIG. 5, a flowchart is shown of an example of an implementation of a sub-method of step 306 performed by the SAR system 110 in extracting from the composite SAR phase history data the first component SAR phase history data corresponding to the first ROI 125 at the location of the first ROI 125 described in FIG. 3 in accordance with subject disclosure. The sub-method of step 306 includes sectorizing 500 the SAR beam 115 into a plurality of sectors, where each sector is defined between a first sectoral angle and a second sectoral angle and each sector corresponds to a Doppler frequency interval having a first frequency value and a second frequency value. Once sectorized, the sub-method also includes decomposing 502 the composite SAR phase history data into a plurality of sectoral SAR phase history data via Doppler processing of an induced azimuth signal. In step 502, each sectoral SAR phase history data corresponds to a unique sector of the plurality of sectors, the first component SAR phase history data corresponds to a first sectoral SAR phase history data corresponding to a first sector of the plurality of the sectors, and the first sector corresponds to a first Doppler frequency interval.

Figure 6:
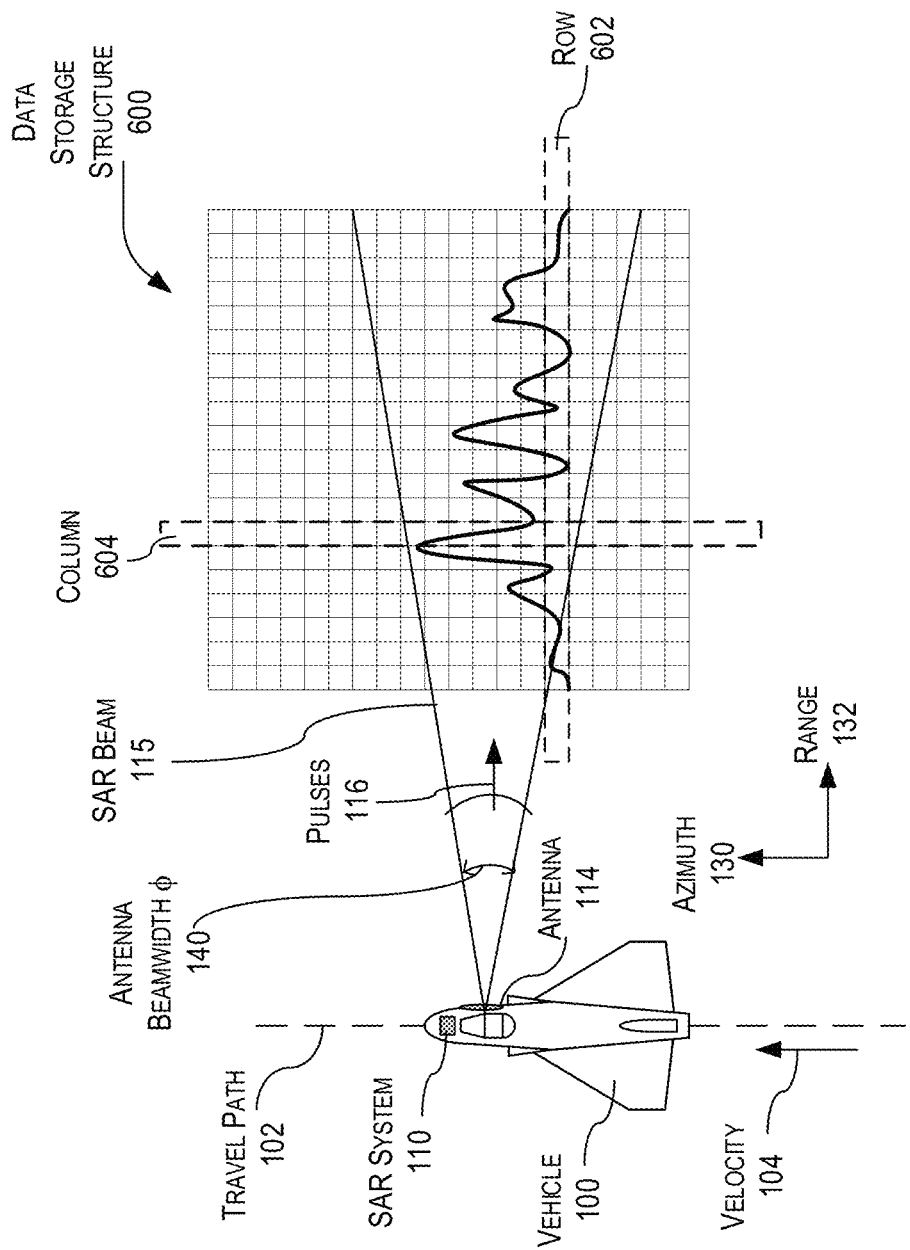
FIG. 6 is a system diagram of an example of an implementation of azimuth signal processing to decompose the radar signal by look angle in accordance with the subject disclosure.

In FIG. 6, a system diagram is shown of an example of an implementation of a data storage structure 600 (of the SAR system 110) for the radar return signals 138 from successive transmitted SAR radar signal pulses 116 in accordance with the subject disclosure. In this example, the data storage structure 600 is shown as a grid data structure having rows along the azimuth direction (e.g., the along-track direction 130) and columns along the range direction (e.g., the across-track direction 132). In this example, the data storage structure 600 is in the storage 206.

In an example of operation, the discrete samples of the radar return signals 138 are recorded and stored in the data storage structure 600. Each row 602 of the data storage structure 600 contains the discrete samples of a radar return signal (from the radar return signals 138) from a single transmitted SAR radar signal pulse from the SAR radar signal pulses 116. The next row up contains samples of the radar return signal from the next transmitted SAR radar signal pulse, and so on. As such, the signal samples stored along a given column 604 constitute an "induced azimuth signal." A significant portion of the processing described in this disclosure is applied to this induced azimuth signal that is generally referred to as simply the "azimuth signal."

In this example, the induced azimuth signal is produced by storing the composite SAR phase history data in a two-dimensional data storage (i.e., data storage structure 600) having the plurality of rows and columns (including row 602 and column 604). Each column of the plurality of columns corresponds to a range value that is measured from a location of the SAR system 110 to the location of the first ROI 125 in a normal direction to a travel path 102 of the SAR system 110 and each column of the plurality of columns is arranged in a direction parallel to the direction of the travel path 102. Additionally, each row contains discrete signal samples of the range values from the composite SAR phase data and each column contains the induced azimuth signal at the corresponding range value.

Figure 7:
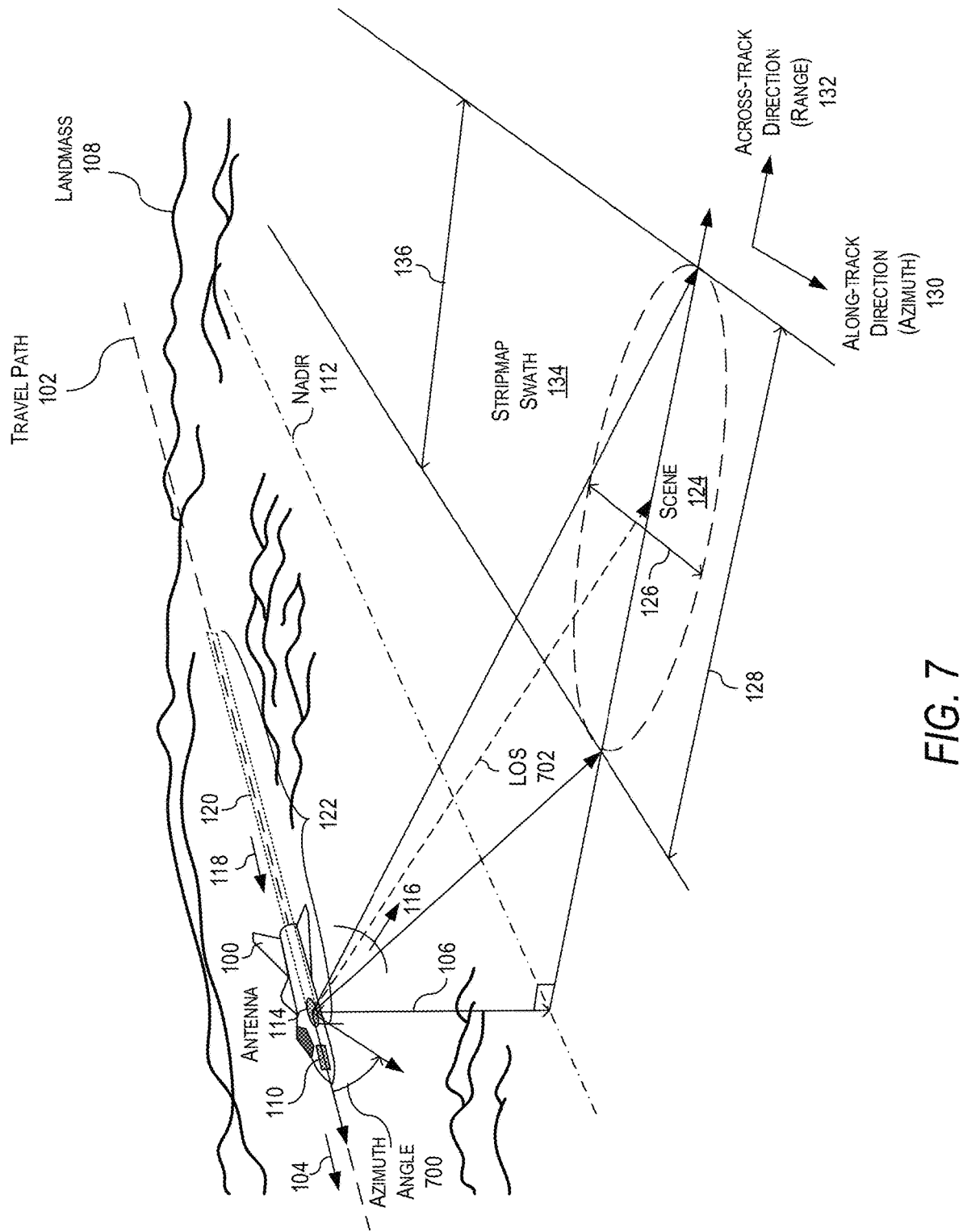
FIG. 7 is a perspective view of a diagram related to the diagram shown in FIG. 1A in accordance with the subject disclosure.

In FIG. 7, a perspective view of a diagram related to the diagram shown in FIG. 1A is shown in accordance with the subject disclosure. In this example, an azimuth angle 700 is shown for the SAR system 110. The azimuth angle 700 is related to a line of sight (LOS) 702 for the SAR system 110, where the LOS 702 is a line between the boresight of the antenna 114 and a point within the scene 124 on the stripmap swath 134. The azimuth angle 700 is equal to an angle between the travel path 102 (e.g., the azimuth direction along the along-track direction 130) and a projection of the LOS 702 to a plane defined by the along-track direction 130 (e.g., the azimuth direction) and the across-track direction 132 (e.g., the range direction).

Figure 8:
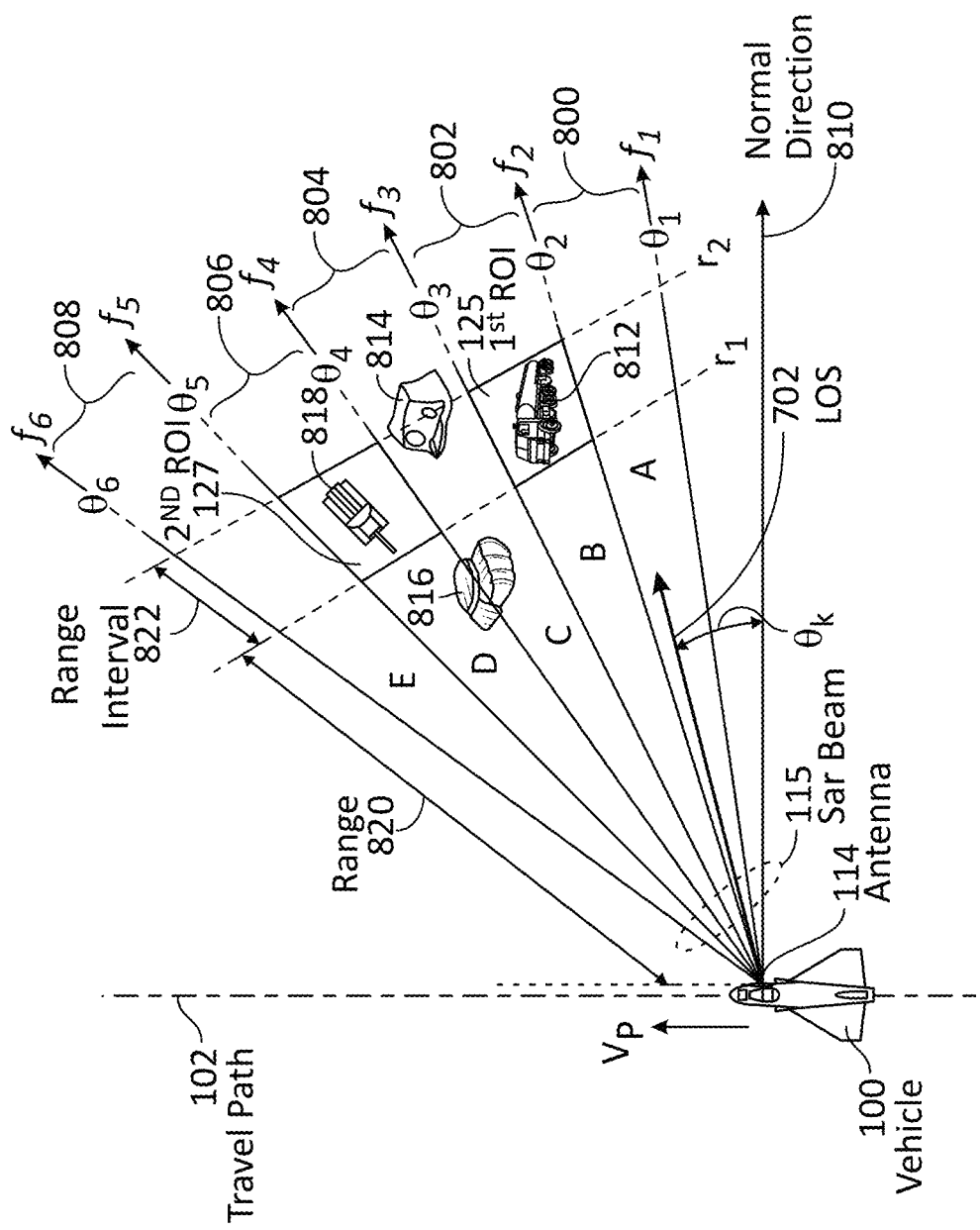
FIG. 8 is a system diagram of an example of an implementation of a method for sectorizing the SAR beam into a plurality of sectors in accordance with the subject disclosure.

In FIG. 8, a system diagram of an example of an implementation of a method for sectorizing the SAR beam 115 into a plurality of sectors A, B, C, D, and E is shown in accordance with the subject disclosure. In this example, each sector A, B, C, D, and E is defined between a first sectoral angle and a second sectoral angle and each sector corresponds to a Doppler frequency interval having a first frequency value and a second frequency value. As an example, the first sector A is defined between the first sectoral angle $\theta_1$ and the second sectoral angle $\theta_2$, the second sector B is defined between the first sectoral angle $\theta_2$ and the second sectoral angle $\theta_3$, the third sector C is defined between the first sectoral angle $\theta_3$ and the second sectoral angle $\theta_4$, the fourth sector D is defined between the first sectoral angle $\theta_4$ and the second sectoral angle $\theta_5$, and the fifth sector E is defined between the first sectoral angle $\theta_5$ and the second sectoral angle $\theta_6$. As such, a first Doppler frequency interval 800 corresponds to the first sector A, a second Doppler frequency interval 802 corresponds to the second sector B, a third Doppler frequency interval 804 corresponds to the third sector C, a fourth Doppler frequency interval 806 corresponds to the fourth sector D, and a fifth Doppler frequency interval 808 corresponds to the fifth sector E.

In this example, the first Doppler frequency interval has a first frequency value $f_1$ and a second frequency value $f_2$, the second Doppler frequency interval has the first frequency value $f_2$ and a second frequency value $f_3$, the third Doppler frequency interval has the first frequency value $f_3$ and a second frequency value $f_4$, the fourth Doppler frequency interval has the first frequency value $f_4$ and a second frequency value $f_5$, and the fifth Doppler frequency interval has the first frequency value $f_5$ and a second frequency value $f_6$. As such, the first frequency value $f_1$ corresponds to the first sectoral angle $\theta_1$, the second frequency value $f_2$ corresponds to the second sectoral angle $\theta_2$, the third frequency value $f_3$ corresponds to the third sectoral angle $\theta_3$, the fourth frequency value $f_4$ corresponds to the fourth sectoral angle $\theta_4$, the fifth frequency value $f_5$ corresponds to the fifth sectoral angle $\theta_5$, and the sixth frequency value $f_6$ corresponds to the sixth sectoral angle $\theta_6$. All of the sectoral angles $\theta_1$, $\theta_2$, $\theta_3$, $\theta_4$, $\theta_5$, and $\theta_6$ are measured relative to the normal direction 810 from the SAR system 110 antenna 114 along the travel path 102.

As an example of operation, four objects 812, 814, 816, and 818 are shown within the SAR beam 115 at sectors B, C, and D. In this example, the first object 812 can be a truck in sector B, second and third objects 814 and 816 can be rock formations in sectors C and D, and the fourth object 818 can be a tank in sector D. The first object 812 can be located in the first ROI 125 and the fourth object 818 can be located in the second ROI 127.

In this example, extracting the SAR phase history data of the four objects 812, 814, 816, and 818 is more challenging than extracting the sub-images of the objects in an image-based system because the reflections from every object or ground feature that is located at overlapping distances from the antenna 114 are intermingled and cannot be readily distinguished from each other in a single return signal. In this example, the first object 812 and fourth object 818 have radar return signals that are superposed because the first object 812 and fourth object 818 are approximately equidistant from the antenna 114 at a range 820 from the position of the antenna 114 as the vehicle 100 travels along the travel path 102.

In order to overcome this problem, the SAR system 110 of the subject disclosure utilizes the known locations of the first ROI 125 and second ROI 127 to extract first component SAR phase history data from the composite SAR phase history data, where the first component SAR phase history data corresponding to the first ROI 125 at the location of the first ROI 125. In this example, the location of the first ROI 125 is within sector B at a range 820 value equal to $r_1$ and the second ROI 127 is within sector D at a range 820 value equal to $r_2$. In this example, the distance between $r_1$ and $r_2$ is a range interval 822 for both the first ROI 125 and the second ROI 127. The locations of the first ROI 125 and second ROI 127 can be obtained from GPS coordinates, a ground spotter, a targeting system, and/or by utilizing the disclosed method for fast ROI detection and localization with reduced synthetic SAR phase history data.

Figure 9:
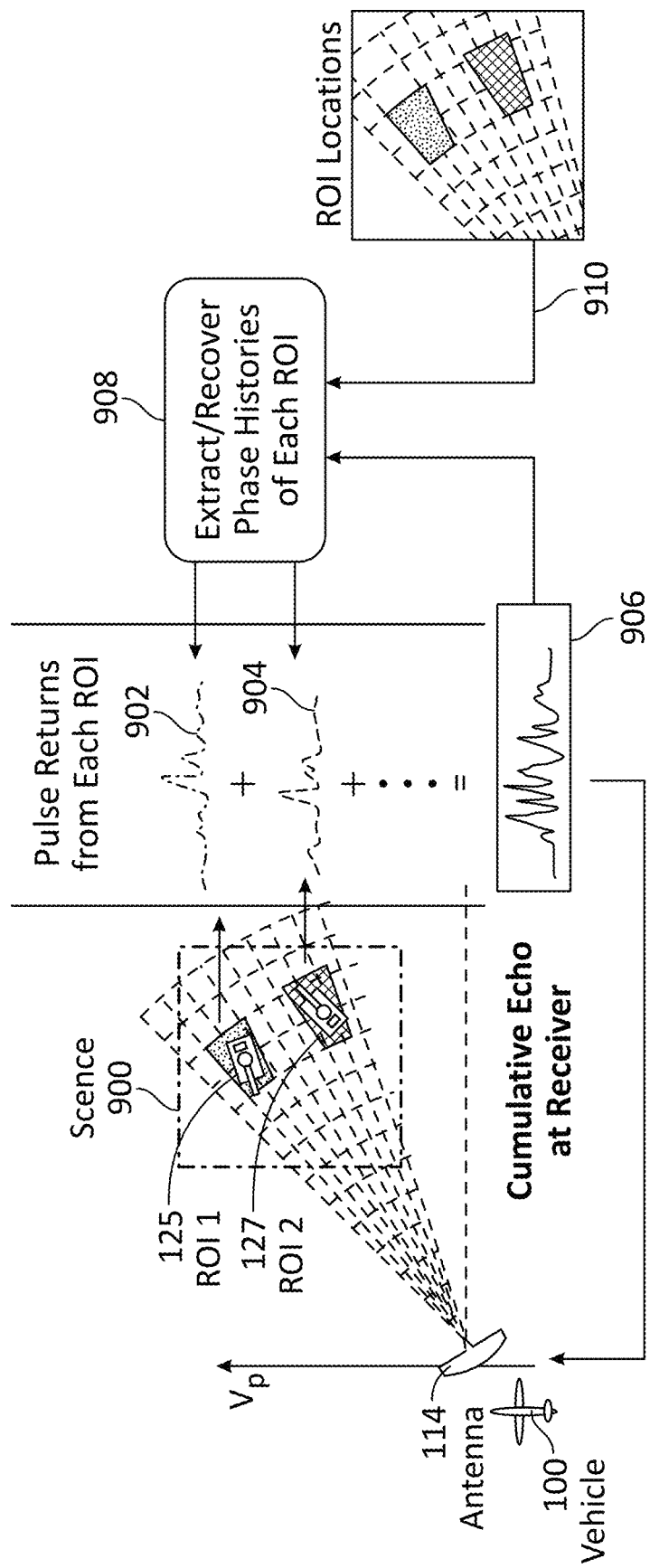
FIG. 9 is a system block diagram for extracting the SAR phase history data for ROIs within a scene in accordance with the subject disclosure.

Turning to FIG. 9, a system block diagram is shown for extracting the SAR phase history data for ROIs within a scene 900 in accordance with the subject disclosure. In this example, the first ROI 125 and second ROI 127 are shown within the scene 900 producing a first component SAR phase history data 902 and a second component SAR phase history data 904, respectively. The first component SAR phase history data 902 and the second component SAR phase history data 904 combine to produce the composite SAR phase history data 906.

In an example of operation, the composite SAR phase history data 906 is input into a SAR system 110 of the disclosed SAR system 110 with the known ROI locations 910 of the first ROI 125 and second ROI 127. The SAR system 110 then extracts the first component SAR phase history data 902 and the second component SAR phase history data 904 from the composite SAR phase history data 906.

Turning back to FIG. 8, the method for ROI detection and localization defines an ROI in terms of spread of angles [θ₁, θ₂], [θ₂, θ₃], [θ₃, θ₄], [θ₄, θ₅], and [θ₅, θ₆] and the range interval 822 [r₁, r₂]. Utilizing this method, the component SAR phase history data extraction for a given range interval can be achieved (e.g., by the SAR system 110) by truncation of the composite SAR phase history data signal based on the range interval 822.

For angle of arrival, the component SAR phase history data is extracted (e.g., by the SAR system 110) by Doppler processing the induced azimuth signal that is formed at each range bin by combining samples from successive backscattered return pulses received at a directional angle ($θ_k$) from the normal direction 810 to the travel path 102. Specifically, a point scatterer, such as an object in an ROI, at the directional angle $θ_k$ induces, to a first order, a Doppler frequency ($f_d$) in the azimuth signal given by relationship (1) that is as follows $$f_d = \frac{2V_p}{\lambda}\sin(\theta),$$

where $V_p$ is the SAR system 110 velocity along the travel path 102 and λ is a wavelength of a carrier frequency of the SAR system 110. This relationship maps a direction of arrival to each frequency component of the induced azimuth signal.

Thus, the return signals emanating from reflectors (e.g., objects in the scene) illuminated by a sector (e.g., sector A, B, C, D, or E) of the SAR beam 115 defined by the range of angles [θ₁, θ₂], [θ₂, θ₃], [θ₃, θ₄], [θ₄, θ₅], or [θ₅, θ₆] have azimuth frequency components in the first frequency interval 800 [f₁, f₂] equal to [$f_d(θ_1)$, $f_d(θ_2)$], the second frequency interval 802 [f₂, f₃] equal to [$f_d(θ_2)$, $f_d(θ_3)$], the third frequency interval 804 [f₃, f₄] equal to [$f_d(θ_3)$, $f_d(θ_4)$], the fourth frequency interval 806 [f₄, f₅] equal to [$f_d(θ_4)$, $f_d(θ_5)$], and the fifth frequency interval 808 [f₅, f₆] equal to [$f_d(θ_5)$, $f_d(θ_6)$]. As a result, the return components corresponding to ROIs in an angular sub-region [$θ_i$, $θ_j$], where i and j are integers, can be extracted (e.g., by the SAR system 110) by bandpass filtering the azimuth signals for frequencies in the corresponding frequency interval [$f_i$, $f_j$]. As such, bandpass filtering the azimuth signal for frequencies in the corresponding frequency intervals enables ROI extraction for a given angle interval of the sectors of the SAR beam 115.

In general, the SAR system 110 can perform the following example operations to facilitate bandpass filtering of the azimuth signal for frequencies: determining a first Doppler frequency $f_d$ in the induced azimuth signal from the backscattered return signals received at a first directional angle θ₁; comparing the first Doppler frequency $f_d$ against each Doppler frequency interval (i.e., first frequency interval 800 [f₁, f₂], second frequency interval 802 [f₂, f₃], third frequency interval 804 [f₃, f₄], fourth frequency interval 806 [f₄, f₅], and fifth frequency interval 808 [f₅, f₆]); and determining that the first Doppler frequency $f_d$ is within the first Doppler frequency interval if the first Doppler frequency $f_d$ is greater than the corresponding first frequency value of the first Doppler frequency interval and less than the corresponding second frequency value of the first Doppler frequency interval. For example, a Doppler frequency $f_d$ is within the first frequency interval 800 if the first Doppler frequency $f_d$ is greater than the value of f₁ and less than the value of f₂. Similarly, the Doppler frequency $f_d$ is within the third frequency interval 804 if the first Doppler frequency $f_d$ is greater than the value of f₃ and less than the value of f₄, and so forth.

Alternatively, the operations to facilitate bandpass filtering of the azimuth signal for frequencies can instead include bandpass filtering the induced azimuth signal from the backscattered return signals received at a first directional angle θ₁ so as to extract the signal frequency components in the first frequency interval 800 [f₁, f₂], second frequency interval 802 [f₂, f₃], third frequency interval 804 [f₃, f₄], fourth frequency interval 806 [f₄, f₅], and fifth frequency interval 808 [f₅, f₆]. In other words, the bandpass filtering utilizes bandpass filters that are designed to have passbands between a first frequency and a second frequency and receive as an input the original signal (i.e., the induced azimuth signal) and the produces an output signal that only contains frequency components of the original induced azimuth signal that fall within the first frequency and second frequency interval.

In this example, the ranges in range interval 822 [r₁, r₂] and angles in [θ₂, θ₃] define the first ROI 125, while the second ROI 127 is delimited by [r₁, r₂] and [θ₄, θ₅]. The portion of a return pulse corresponding to ranges in [r₁, r₂] includes reflections from the two ground vehicles (i.e., first object 812 and fourth object 818) in each of the ROIs 125 and 127 as well as part of a large boulder (i.e., second object 814). By bandpass filtering the azimuth signals for frequencies in [f₂, f₃] and [f₄, f₅], the SAR system 110 extracts the radar returns corresponding to the SAR beam 115 sectors B and D defined by [θ₂, θ₃] and [θ₄, θ₅]. The SAR system 110 further extracts the portion of each signal corresponding to ranges in [r₁, r₂] to end up with two received signals emanating from each of the ROIs 125 and 127, free of interference from each other as well as from the boulders (i.e., object 814) and other reflective features in the scene. These two extracted signals represent the vehicles in each ROI (i.e., first object 812 in the first ROI 125 and the fourth object 818 in the second ROI 127) and can be passed to a phase history based ATR system for identification.

As an example of truncation, the SAR system 110 determines a first ROI 125 range of the location of the first ROI 125 from the SAR system 110 within a range interval within the scene 124, 170, or 175, and truncates the first sectoral SAR phase history data to produce a trucked first sectoral SAR phase history data corresponding to the first sector and the range interval. For example, the first ROI 125 is located within sector B at the range interval 822, as such, the first sectoral SAR phase history data is produced by filtering the azimuth frequency components in the first frequency interval 802 and then truncating resulting first sectoral SAR phase history data signal by eliminating parts of the first sectoral SAR phase history data that are a result of ranges below r₁ or above r₂.

In order to perform this method, the SAR system 110 needs to track the ROI position during travel. As the SAR system 110 moves along its flight trajectory along the travel path 102, both the range to an ROI and the angles defining the beam sector containing that ROI change.

Figure 10A:
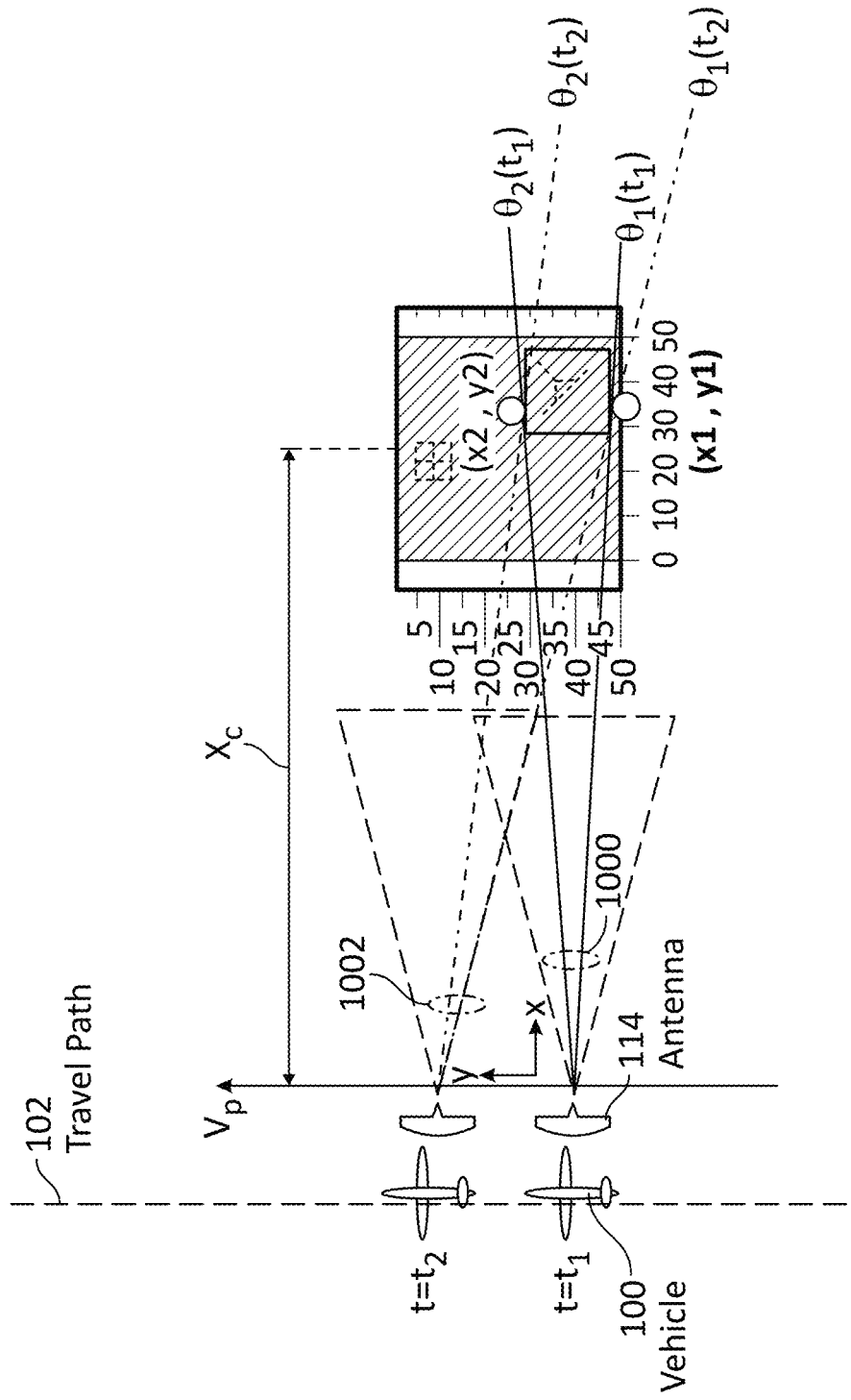
FIG. 10A is a block diagram of an example of a system showing how the range and angles to an ROI change during travel of the SAR system in accordance with the subject disclosure.
Figure 10B:
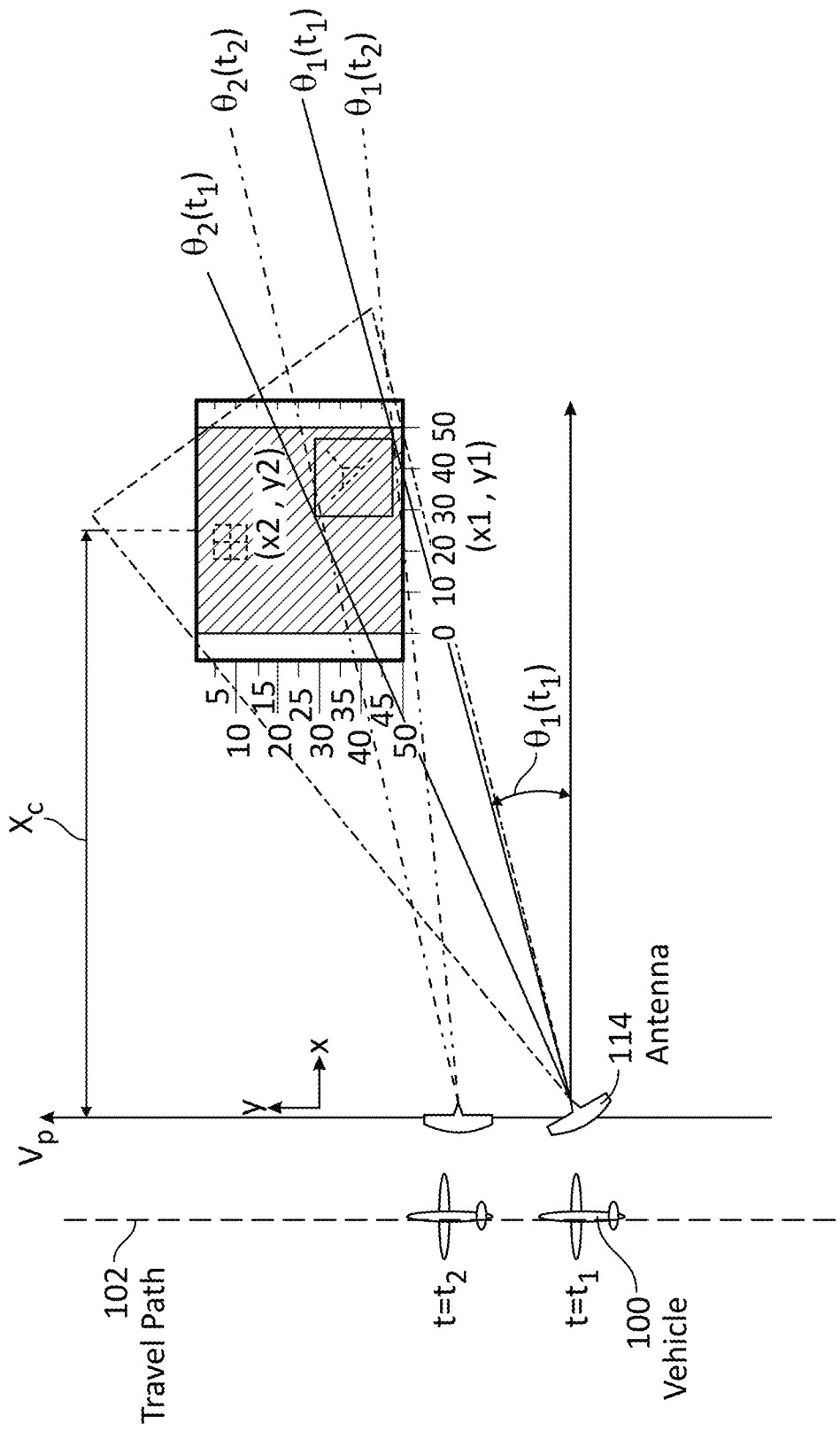
FIG. 10B is a block diagram of another example of a system showing how the range and angles to an ROI change during travel of the SAR system in accordance with the subject disclosure.

FIG. 10A, illustrates an example system showing how the range and angles to an ROI change during travel of the SAR system 110 in accordance with the subject disclosure. FIG. 10B, illustrates another example system showing how the range and angles to an ROI change during travel of the SAR system 110 in accordance with the subject disclosure. In these examples, the SAR beam 115 illuminating an ROI evolves during flight along the travel path 102 from time $t_1$ (the first sector 1000) to time $t_2$ (the second sector 1002), for the SAR system 110 in a stripmap mode in FIG. 10A and spotlight mode in FIG. 10B. These changes are accounted for by the SAR system 110 so as to correctly extract the phase history for an ROI. In particular, since the angular position of the ROI changes during travel, the method changes the frequency passband of the ROI extraction filter according to relationship (1). Thus, the angles $[\theta_1(t), \theta_2(t)]$ defining the beam sector illuminating an ROI are a function of time, and therefore, so is the passband of the frequency interval $[f_1(t), f_2(t)]$ since it is related to the angles via relationship (1).

Figure 11:
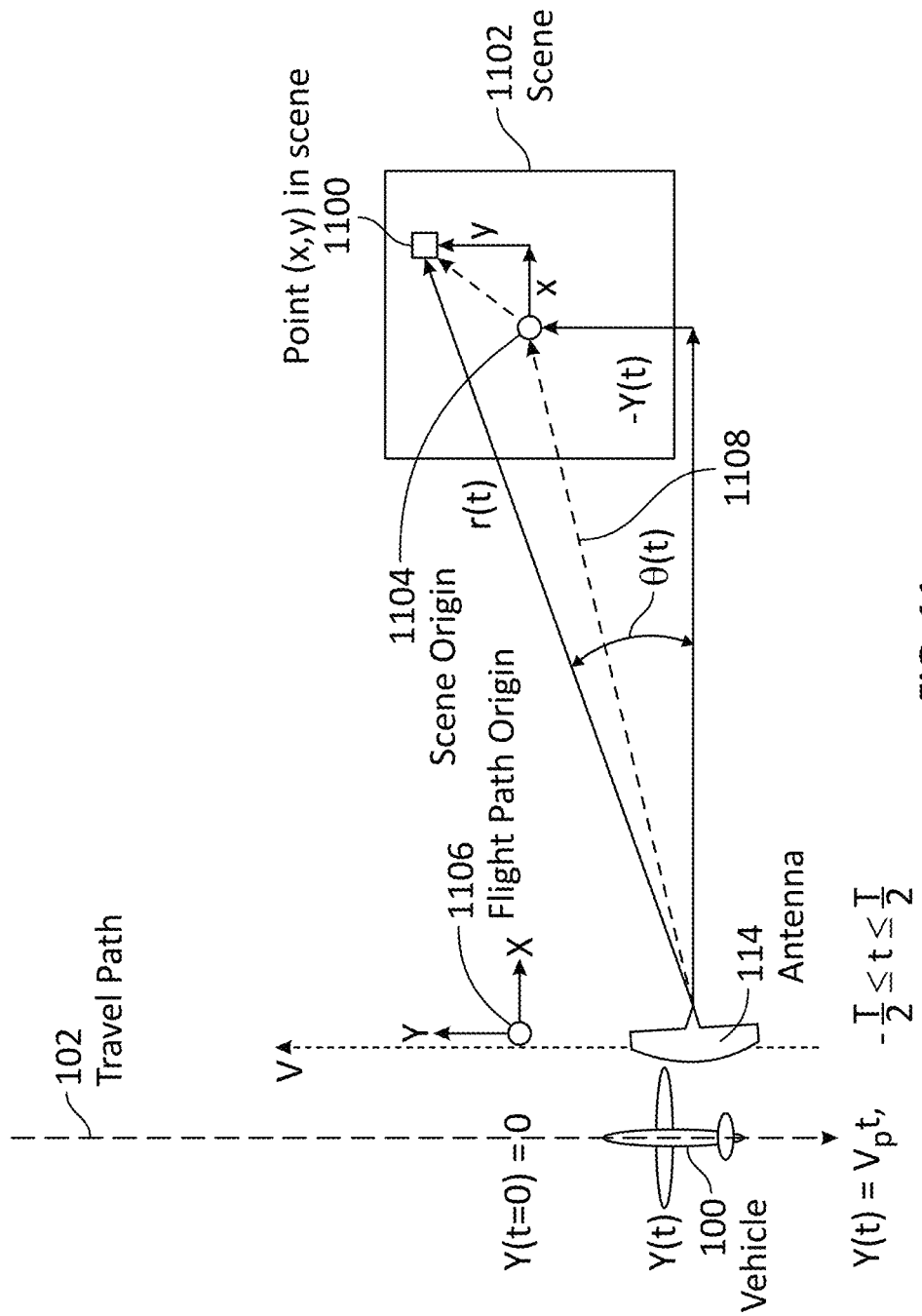
FIG. 11 is a block diagram of the geometry setup for computing the time-dependent range and beam sector angles illuminating the ROI shown in FIGS. 10A and 10B in accordance with the subject disclosure.

In FIG. 11, illustrated is a geometry setup for computing the time-dependent range and beam sector angles illuminating the ROI shown in FIGS. 10A and 10B in accordance with the subject disclosure. Based on the coordinate system shown in FIG. 11, the SAR system 110 utilizes the following relationships to determine the change in range r(t) and angle θ(t) for a given point 1100 on a scene 1102. In this example, (X=0, Y) are the coordinates of the antenna 114 on the vehicle 100 traveling at velocity $V_p$ in the Y direction along the travel path 102, such that $Y(t)=V_p t$, with $-T/2 \le t \le T/2$, where T is a duration of the flight of the SAR system 110 on the vehicle 100 while illuminating the SAR scene 1102. In this example, the SAR scene has a center 1104 (i.e., the scene origin) that is a distance $X_c$ away from a flight path origin 1106 in a normal direction to the travel path 102. The local coordinates of the point 1100 in the SAR scene 1102 are (x, y) with respect to the scene center 1104, where x is a first distance value of the point 1100 in the scene 1102 along the normal direction of the travel path 102 with respect to the center 1104 of the scene 1102 and y is a second distance value of the point 1100 along a direction parallel to the travel path 102 with respect to the center 1104 of the scene 1102. A line segment 1108 drawn from the antenna 114 to the point 1100 has an azimuth angle θ(t) and range r(t) (i.e., distance) that are given as functions of time by the relationships $$\theta(t) = \operatorname{atan}\left(\frac{y - V_p t}{x + X_C}\right), \text{ and} \quad (2)$$

$$r(t) = \sqrt{(x + X_C)^2 + (y + V_p t)^2}. \quad (3)$$

Turning back to FIG. 10A, two points $(x_1, y_1)$ and $(x_2, y_2)$ can be chosen such that two line segments joining the antenna 114 to these points define a beam sector containing the ROI. The time-dependent bandpass frequencies $[f_1(t), f_2(t)]$ of an ROI filter are then obtained by substituting into relationship (1) the beam sector defining angles $[\theta_1(t), \theta_2(t)]$ given by relationship (2).

Figure 12:
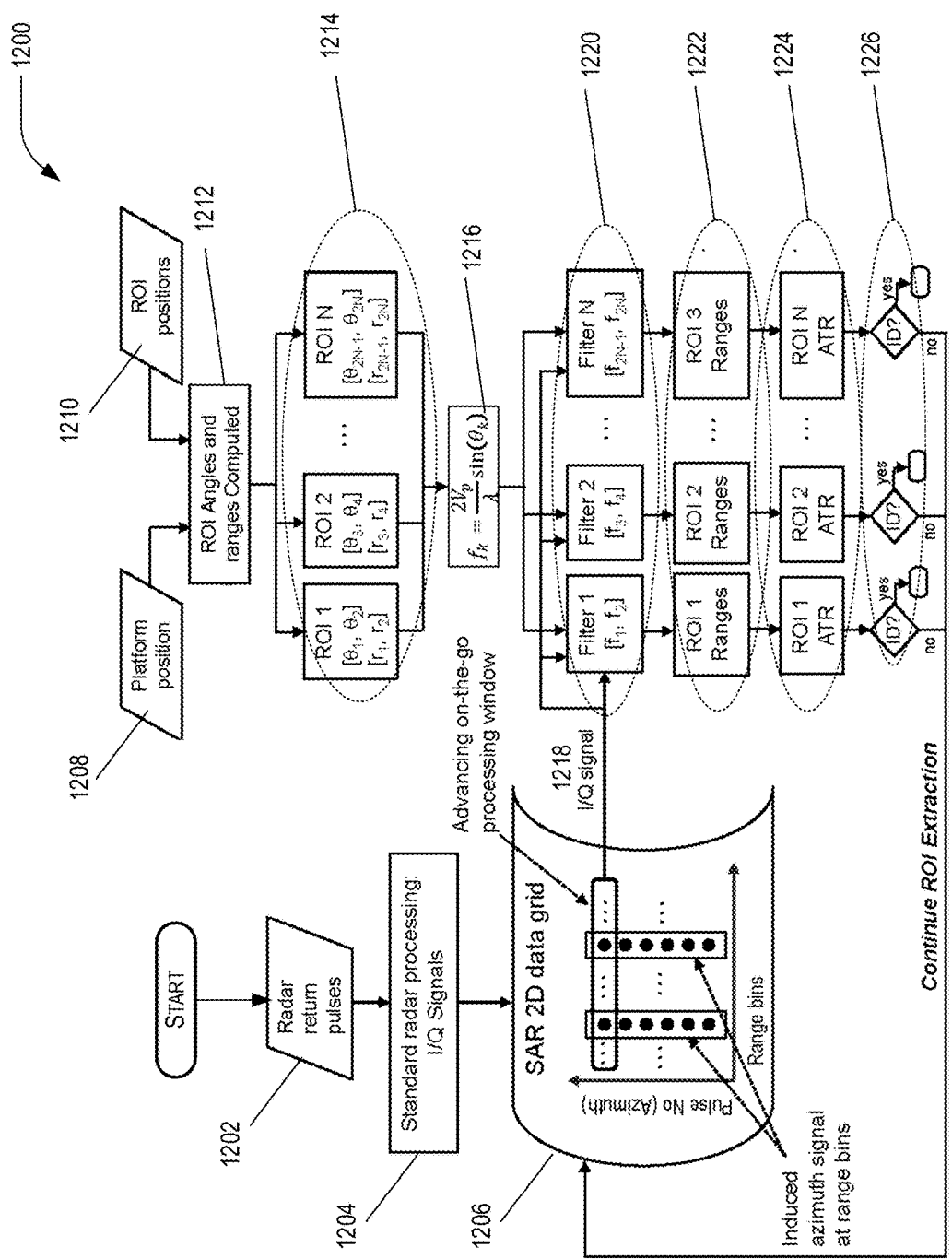
FIG. 12 is a flow diagram of an example of implementation of the method for extraction of an ROI from a composite SAR phase history data in accordance with subject disclosure.

In FIG. 12 a flow diagram is shown of an example of implementation of a method 1200 for extraction of an ROI from a composite SAR phase history data in accordance with subject disclosure. As an example, the method 1200 can be performed at least in part by the SAR system 110 disclosed herein. The method 1200 starts by receiving 1202 the radar return pulses. The radar return pulses are then processed 1204, where the processing includes quadrature (I/Q) demodulation and analog-to-digital (ADC) processing. The processed radar return pulses are written 1206 to a two-dimensional SAR data grid memory where the data grid is organized as columns of range bins and rows of pulse numbers where the columns are the induced azimuth signal at range bins. The method 1200 then receives 1208 position of SAR system 110, receives 1210 the ROI positions, and computes 1212 the ROA angles and ranges to determine 1214 the range and angle extents of the ROIs (i.e., a first ROI through an $N^{th}$ ROI) that are used to calculate 1216 the corresponding Doppler frequencies corresponding to the angle extents using the relationship (1). The method 1200 then receives 1218 an I/Q signal from the SAR two-dimensional data grid that is a row of range bin values that are retrieved with an advancing on-the-go processing window and the Doppler frequencies from step 1216 and bandpass filters 1220 each ROI for angular extraction by bandpass filtering the received induced azimuth signal to produce output signals (i.e., a new induced azimuth signal) that contains frequency components of the original induced azimuth signal that fall within the passbands of the bandpass filters.

The method 1200 then performs range extraction 1222 for each ROI and each extracted phase history for each ROI is then fed 1224 into an ATR. If the method 1200 does not extract all of the ROIs with the N bandpass filters, it repeats with another row of range bin values for the I/Q signal. Once all the ROIs have been extracted, the method 1200 ends.

Figure 13:
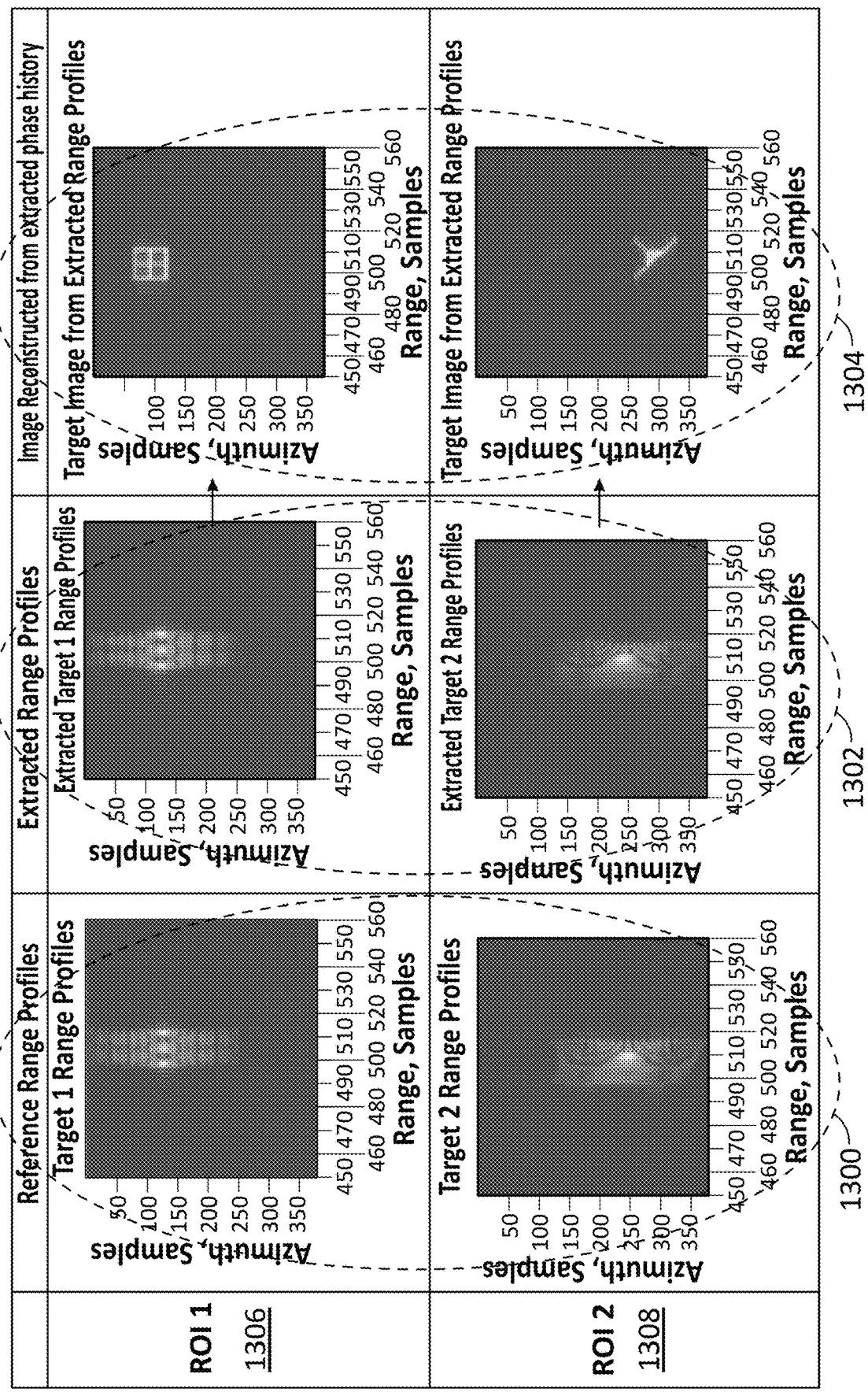
FIG. 13 are graphical depictions of examples of images of reference range profiles, extracted range profiles, and reconstructed images of a first ROI and second ROI in accordance with the subject disclosure.

In FIG. 13, examples of images of reference range profiles 1300, extracted range profiles 1302, and reconstructed images 1304 of a first ROI 1306 and second ROI 1308 are shown in accordance with the subject disclosure. In these examples, the extracted and reconstructed images 1304 and 1306 are of individual target range profiles extracted from the composite scene that agree well with the images of reference range profiles 1300 produced by the single-target scenes.

Fast ROI Detection and Localization with Reduced SAR Phase History Data

As discussed earlier, the method for extraction of an ROI from a composite SAR phase history data needs to obtain a location for the ROI in order to perform the extraction. The systems and methods described in the subject disclosure can also be utilized to quickly detect and localize in real-time the ROI in a SAR scene with reduced SAR phase history data and without utilizing full image reconstruction. This method needs only a small fraction of the number of radar returns needed for normal image reconstruction and, therefore, is much faster than the known methods that utilize reconstruction of a full image.

The main elements of this method include (1) a sub-method that reveals the ROIs in a SAR scene 124, 170, or 175 using a small number of return signals and (2) another sub-method that is paired with the first sub-method, where the second sub-method detects the ROIs and localizes them. Similar to the previous method for extraction of the ROI, the first sub-method separates the backscattered return pulses from a SAR scene 124, 170, or 175 into components corresponding to the different sectors of the SAR beam 115 to produce a pseudo-image having a plurality of pixels where each pixel corresponds to a range bin and an angular sector of the SAR beam 115. The second sub-method receives as input this pseudo-image and detects regions with high scattering energy (i.e., energy "blobs") within the pseudo-image and then places bounding ellipses around the detected regions, thus defining the ROIs and localizing them in terms of azimuth angle and range within the SAR beam 115.

These ellipses can then be mapped back to the physical SAR scene 124, 170, or 175 based on SAR beam 115 and travel path 102 geometry, thus defining on the ground ROIs that can contain targets of interest. It is important to note that, in this example, the processing to form the pseudo-image happens "on-the-go" as the SAR phase history data is being collected.

It is appreciated by those of ordinary skill in the art that detection and localization of ROIs has many uses, such as tracking and surveilling targets, and these uses can include utilizing other types of sensors (e.g., IR, optics, etc.). In this disclosure, the detection and localization of these ROIs is described as both an independent process and as an element of the method for extraction of one or more ROIs from a composite SAR phase history data such that the component SAR phase history data or range profiles of each individual ROI can be feed as inputs to one or more ATR engines.

As described earlier, unlike for image-based methods where the methods can readily delineate multiple targets within an image and extract a sub-image for each, the phase histories of multiple targets on a SAR scene are completely intermingled with each other as well as with contributions from the entire background. Thus, given a SAR data set, there is a need to decompose the phase history or range profile data into components that can be assigned to specific scattering ROIs in the SAR scene.

In order to perform this function, the disclosed method, as a first step, detects the strongly scattering regions or ROIs within the phase history data, so as to, in a second step, localize the strongly scattering regions or ROIs in the physical SAR scene, and, in a third step, extract the phase history contributions emanating from the strongly scattering regions or ROIs using the information obtained from the first and second steps. In general, these operations need to be performed with sufficient efficiency to maintain the reduced computational load advantage of phase history based ATR methods compared to image-based systems.

It is appreciated by those of ordinary skill in the art that while the focus of this disclosure is on the detection and localization operations were phase history extraction is need, it is noted that this fast detection and localization method can also be utilized for other purposes. For example, once targets are detected and localized with this method, these targets can be tracked with other sensors such that these targets can be engaged or evaded, or alternatively the information of the targets can be utilized for various other intelligence purposes.

Turning back to FIG. 1, a SAR system 110 is an imaging radar mounted on a moving platform (such as vehicle 100) travelling along a prescribed path (i.e., the travel path 102). The antenna 114 continuously transmits electromagnetic pulses 116 and receives backscattered echoes (i.e., return 138 for FIGS. 1B-1D) that are digitized and stored for subsequent image processing, as shown in the standard data grid structure (i.e., data storage structure 600) of FIG. 6. Each row 602 contains the discrete I/Q samples of the echo return 138 from a transmitted pulse 116. As the return signals 138 are sequentially stacked up by row 602, a two-dimensional phase history data set is created, with the samples along a given column 604 forming the so-called induced azimuth signal. After a sufficient number of echoes returns 138 are stored to synthesize a large aperture, the phase history I/Q data can be processed to reconstruct an image that can be utilized for many applications.

As discussed previously, the are challenges in processing SAR scenes 124, 170, or 175 that contain multiple ROIs, targets, and/or various reflective objects in the background of the SAR scene 124, 170, or 175, because although a SAR beam 115 illuminates a two-dimensional footprint on the ground of the scene 900, the echo from a single pulse is essentially a one-dimensional entity that provides only range information. As such, the reflections from every object or ground feature that are equidistant from the SAR antenna 114 are intermingled (i.e., composite SAR phase history data 906) and cannot be distinguished from each other in a single return signal, as illustrated in FIG. 9.

Figure 14:
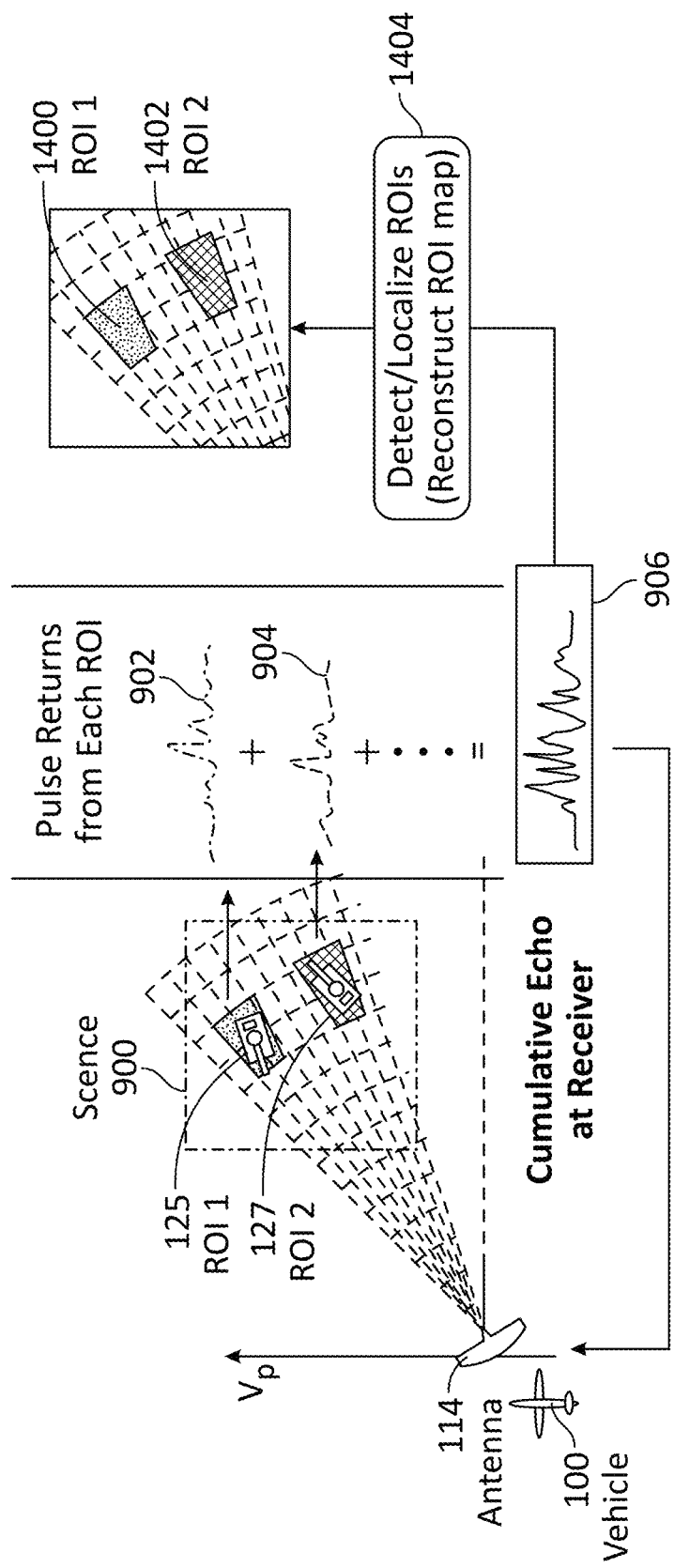
FIG. 14 is a system block diagram for detecting and localizing the ROIs within a scene in accordance with the subject disclosure.

Turning to FIG. 14, a system block diagram is shown for detecting and localizing the ROIs 1400 and 1402 within the SAR scene 900 in accordance with the subject disclosure. The method described in this system block diagram (e.g., performed by SAR system 110) quickly detects and localizes the first ROI 1400 and second ROI 1402 in the SAR scene 900 and passes that information to the extraction method previously described. The process of detecting and localizing the ROIs includes, given the return pulses that represent the cumulative reflections (i.e., composite SAR phase history data 906) from the entire SAR scene 900, inverse mapping 1404 onto the SAR scene 900 the locations of the first ROI 1400 and second ROI 1402. As discussed earlier, the method for detection and localization of the ROIs is a two-step method that includes (1) a sub-method for creating a pseudo-image via angular decomposition of the SAR beam 115 into sectors and (2) applying a detection and localization sub-method to this pseudo-image.

Similar to the previous description in relation to FIG. 8, the sub-method for creating a pseudo-image via angular decomposition of the SAR beam 115 into sectors includes decomposing the return pulses 138 into contributions from each sector of the illuminating SAR beam 115 via Doppler processing of the induced azimuth signal, with each sector of the SAR beam 115 corresponding to a Doppler frequency interval, as shown in FIG. 8. An induced azimuth signal is formed at each range bin by combining samples from successive return pulses 138. This process is shown in FIG. 6 where successive pulses are stacked vertically, with each column 604 of data forming the induced azimuth signal at a given range.

As described earlier, all radar reflecting features in the SAR scene 124, 170, or 175 that are at an angle θ from a vector perpendicular (i.e., the normal direction 810) to the travel path 102 induce a Doppler frequency in the azimuth signal given by the previously described relationship (1)—i.e., $$f_d = \frac{2V_p}{\lambda}\sin(\theta).$$

Relationship (1) maps a direction of arrival to each frequency component of the induced azimuth signal. Thus, the return signals emanating from reflectors illuminated by the sector of the SAR beam 115 defined by the range of angles $[\theta_i, \theta_{i+1}]$ (where i ranges from 1 to 6 in this example) have azimuth frequency components in the interval $[f_i, f_{i+1}]$, where f (i.e., $f_d$) is given by relationship (1). Again, it follows that by bandpass filtering the azimuth signal, the return signals can be decomposed into contributions from different sectors (i.e., sectors A, B, C, D, or E) of the SAR beam 115, as shown in FIG. 8, which enables ROI localization in the angular direction.

Figure 15:
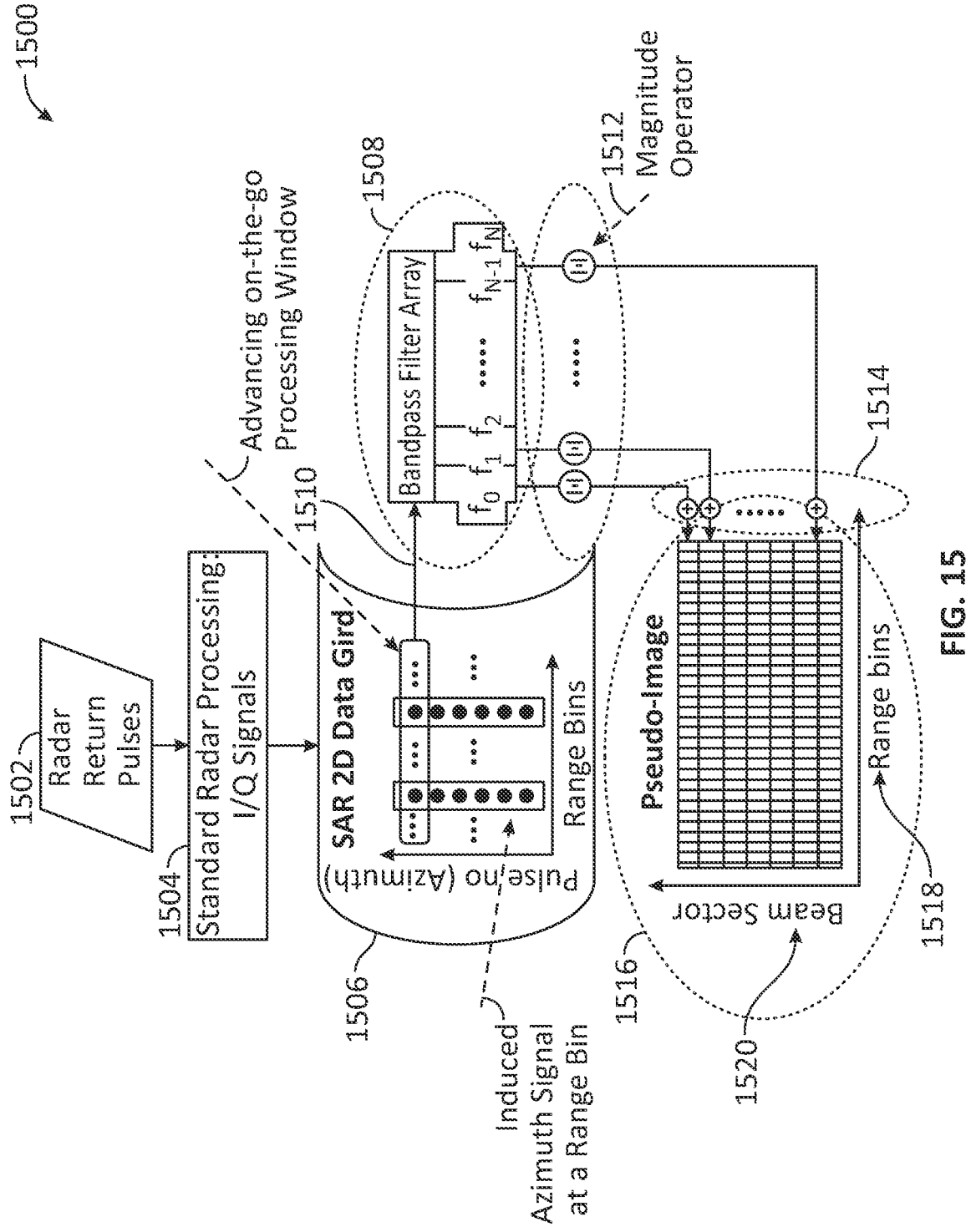
FIG. 15 is a flow diagram of an example of implementation of the method for forming a pseudo-image via angular decomposition of the SAR beam 115 into sectors in accordance with subject disclosure.

In FIG. 15, a flow diagram is shown of an example of implementation of a method for forming a pseudo-image via angular decomposition of the SAR beam 115 into sectors in accordance with subject disclosure. As an example, the method 1500 can be performed at least in part by the SAR system 110 disclosed herein. The method 1500 starts as each radar return signal 138 is collected 1502 as an I/Q signal and pre-processed 1504. The processed signals are stacked 1506 at the top of the two-dimensional SAR data grid, and a bandpass filter array is immediately applied 1508 to the new data 1510 (i.e., the azimuth signal) along the azimuth direction at each range. If the SAR beam 115 is decomposed into N sectors, then there are N bandpass filters in the bandpass filter array where each filter outputs its own I/Q signal. The magnitude of each I/Q signal is taken 1512 and added 1514 to their corresponding row in a pseudo-image grid 1516. Repeating this process for a few return pulses 138 forms a pseudo-image that has high resolution in the range direction (i.e., range bins 1518) but coarse resolution in the angular direction (beam sector 1520) in comparison to an actual SAR image. While, in general, this coarse beam sector resolution does not allow identifying objects, it does reveal the presence of radar reflecting objects in that sector of the SAR beam 115, thus allowing the detection of the object in the sector.

Figure 16:
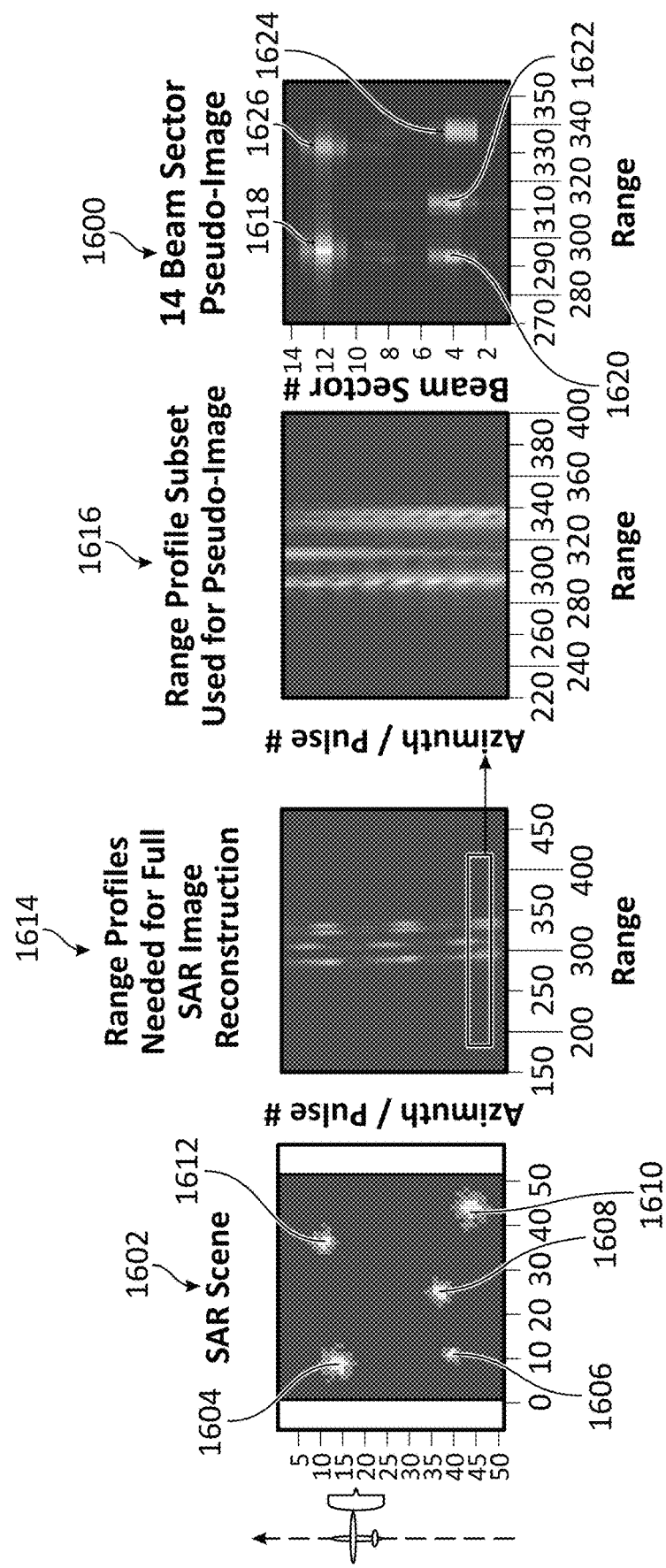
FIG. 16 illustrates graphical depictions of an example of implementation of the pseudo-image of a scene having five targets is shown in accordance with the subject disclosure.

In FIG. 16, graphical depictions are illustrated of an example of implementation of the pseudo-image 1600 of a SAR scene 1602 having five targets 1604, 1606, 1608, 1610, and 1612 is shown in accordance with the subject disclosure. In this example, synthesized range profiles 1614 of the SAR pulse returns are shown, where the synthesized range profiles 1614 are needed for full image construction. The synthesized range profiles 1614 are the magnitude of the I/Q phase histories. These synthesized range profiles 1614 are shown as extending in azimuth/pulse number versus range. In this example, a small subset of the synthesized range profiles 1616 are shown extending in azimuth/pulse number versus range. The subset of the synthesized range profiles 1616 are utilized to compute (e.g., by SAR system 110) the pseudo-image 1600.

From this example, five targets 1618, 1620, 1622, 1624, and 1626 are shown in the pseudo-image 1600 that correspond to the five targets 1604, 1606, 1608, 1610, and 1612 in the SAR scene 1602. It is appreciated by those of ordinary skill in the art that while it may not be able to discern the finer details of the five targets 1618, 1620, 1622, 1624, and 1626 in the pseudo-image 1600, their existence and locations are clearly revealed by the pseudo-image 1600, using less expensive "on-the-go" calculations and a much smaller phase history data set than needed for the full image reconstruction. It is appreciated that the range profiles of the two targets 1604 and 1606 on the left of the SAR scene 1602 are intermingled and how the pseudo-image 1600 reveals the existence of the corresponding two targets 1618 and 1620 for the left-side range profile.

As an example of implementation, the bandpass filter array can be implemented with, for example, a bank of Butterworth filters that are immediately applied to the induced azimuth signal 1510 at each range as new return signal are received. Such on "on-the-go" processing provides a speed advantage, whereas with standard image reconstruction there is a need to finish collecting all the necessary pulses before any processing can begin, resulting in significant delay in providing detection and localization information. Any other type of bandpass filter can also be utilized, such as, for example, elliptic and Chebyshev filters. As an alternative, a Fast Fourier transform can also be utilized to decompose the azimuth signal into its Doppler frequencies, but that would entail relinquishing the on-the-go processing advantage since it requires waiting to complete data collection before any processing can begin.

It is further appreciated by those of ordinary skill in the art that while this method relies on coarse angular resolution, if an application arises requiring more precision, the method can be modified to use bandpass filters with adjustable bandwidths (similar to the examples shown previously) to account for line of sight to a target changing slightly because of the SAR system 110 moving along its travel path 102 and/or the antenna 114 slightly changing its aiming direction (as would be the case for spotlight mode SAR). In these situations, changes in angles of the SAR beam sector can be compensated by adjusting the frequencies of the bandpass filters per relationships (1)-(3) and the description related to FIGS. 10A-11.

Once the pseudo-image 1600 has been generated, the second sub-method for the ROI detection and localization takes as input the pseudo-image (such as pseudo-image 1600) generated by the first sub-method to detect salient features that are basically "blobs" of energy and draws bounding ellipses around them, thus defining the ROIs and localizing them in terms of azimuth angle and range. As an example, since the pseudo-image 1600 shown in FIG. 16 is very much like a regular image, but with very coarse resolution along one axis, it can still leverage image-processing techniques to detect any ROIs within a pseudo-image 1600.

The disclosed method of the subject application identifies the salient objects in these low-resolution pseudo-images in two steps. First, the input pseudo-image is threshold processed with an adaptive threshold to obtain a binary image. The threshold processing can include utilizing a technique described by Otsu, Nobuyuki. "A threshold selection method from gray-level histograms." IEEE transactions on systems, and cybernetics 9.1 (1979): 62-66, which is herein incorporated by reference in its entirety.

Second, the sub-method utilizes classic morphological operations, e.g., image opening operation, together with connected component labeling to identify the objects in the image, using a size threshold to exclude small artifacts in the data. It is appreciated by those of ordinary skill in the art that connected components labeling is an algorithmic application of graph theory in which subsets of connected components are uniquely labeled based on a given heuristic. After obtaining the connected components, the sub-method obtains the centroid, major axis, minor axis, and the orientation of each object, which uniquely identifies an ellipse around each object. Each ellipse provides both range and angle extents that are mapped to the SAR scene 900 for localization on the terrains, as illustrated in FIG. 14 in block 1404. In this example, the detection and localization sub-method can be applied to pseudo-images in real-time as it takes only a few milliseconds to find the objects. Since a pseudo-image has significantly fewer data points compared a full resolution image means energy blobs can be detected faster, providing yet another advantage over traditional image-based ATR methods.

Once the ROIs (i.e., first ROI 1400 and second ROI 1402) are detected and localized on a SAR scene 900, the information can be handed over to other surveillance sensors, tracking stations, or targeting systems. The localization information can also be used by a system that extracts the SAR phase histories of each individual ROIs for ATR applications such as the previous described systems and methods for extraction of an ROI from a composite SAR phase history data.

Figure 17:
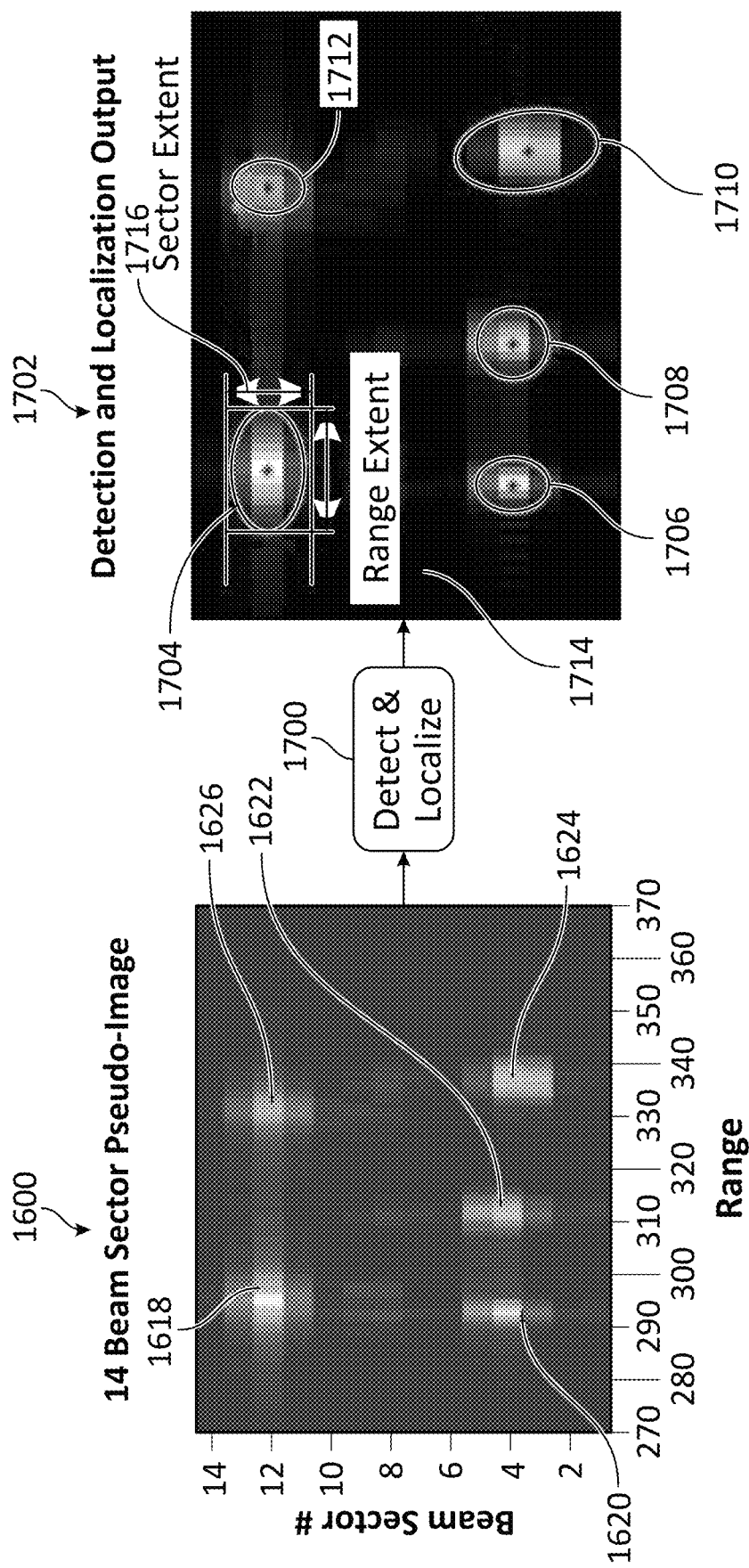
FIG. 17 illustrates graphical depictions of an example of implementation of the ROI detection and localization on the pseudo-image of a SAR scene in accordance with the subject disclosure.

Turning to FIG. 17, graphical depictions are illustrated of an example of implementation of the ROI detection and localization on the pseudo-image 1600 of a SAR scene 1602 in accordance with the subject disclosure. In this example, the sub-method detects and localizes 1700 the ROIs (e.g., targets 1618, 1620, 1622, 1624, and 1626) in the pseudo-image 1600 utilizing morphological operations together with connected component labeling to identify the targets 1618, 1620, 1622, 1624, and 1626 in the pseudo-image 1600, using a size threshold to exclude small artifacts in the data. The resulting detection and localization output 1702 includes five ellipses 1704, 1706, 1708, 1710, and 1712 corresponding to the targets 1618, 1620, 1622, 1624, and 1626 in the pseudo-image 1600, where each ellipse 1704, 1706, 1708, 1710, or 1712 has a sector extent 1714 and range extent 1716. Each ellipse 1704, 1706, 1708, 1710, or 1712 bounds each of the five detected targets 1618, 1620, 1622, 1624, and 1626, with the size and orientation of each ellipse 1704, 1706, 1708, 1710, or 1712 defining a boundary for the ROIs (i.e., targets 1618, 1620, 1622, 1624, and 1626) on the SAR scene.

Further, the disclosure comprises embodiments according to the following clauses.

Clause 1. A method that extracts a region of interest (ROI) from composite synthetic aperture radar (SAR) phase history data, the method comprising: receiving, by a SAR system, the composite SAR phase history data of a plurality of backscattered return signals produced as a result of the SAR system illuminating a scene with a SAR beam; obtaining a location of a ROI within the scene; and extracting from the composite SAR phase history data a component SAR phase history data corresponding to the ROI, wherein the component SAR phase history data is to be utilized for object detection.

Clause 2. The method of clause 1, further comprising inputting the component SAR phase history data to an automatic target recognition (ATR) engine.

Clause 3. The method of clause 1 or 2, wherein the extracting the composite SAR phase history data comprises: sectorizing the SAR beam into a plurality of sectors, wherein each sector is defined between a first sectoral angle and a second sectoral angle and each sector corresponds to a Doppler frequency interval having a first frequency value and a second frequency value; and decomposing the composite SAR phase history data into a plurality of sectoral SAR phase history data via Doppler processing of an induced azimuth signal, wherein each sectoral SAR phase history data corresponds to a unique sector of the plurality of sectors, the component SAR phase history data corresponds to a first sectoral SAR phase history data corresponding to a first sector of the plurality of the sectors, and the first sector corresponds to a first Doppler frequency interval.

Clause 4. The method of clause 2 or 3, wherein the induced azimuth signal is produced by storing the composite SAR phase history data in a two-dimensional data storage having a plurality of rows and a plurality columns, wherein each row of the plurality of rows corresponds to a range value that is measured from a location of the SAR system to the location of the ROI in a normal direction to a travel path of the SAR system and each column of the plurality of columns is arranged in a direction parallel to the direction of the travel path, and wherein each row comprises discrete signal samples of the range values from the composite SAR phase data and each column comprises the induced azimuth signal at a corresponding range value.

Clause 5. The method of clause 3 or 4, wherein the Doppler processing the induced azimuth signal includes determining a first Doppler frequency in the induced azimuth signal from the backscattered return signals received at a first directional angle ($\theta_1$) from the normal direction to the travel path, wherein the first Doppler frequency ($f_1$) is defined by a relationship $$f_1 = \frac{2V_p}{\lambda}\sin(\theta_1),$$

wherein $V_p$ is a velocity of the SAR system along the travel path and $\lambda$ is a wavelength of a carrier frequency of the SAR system, bandpass filtering the induced azimuth signal, with a bandpass filter having a passband, to produce a new induced azimuth signal that includes frequency components of the induced azimuth signal that fall within the passband.

Clause 6. The method of clause 3, 4, or 5, wherein the extracting the composite SAR phase history data further comprises determining a first ROI range of the location of the ROI from the SAR system within a range interval within the scene, and truncating the first sectoral SAR phase history data to produce a trucked first sectoral SAR phase history data corresponding to the first sector and the range interval.

Clause 7. The method of clause 5 or 6, wherein the bandpass filtering includes bandpass filtering the induced azimuth signal between the first frequency value and the second frequency value of the first Doppler frequency interval.

Clause 8. The method of clause 5 or 6, wherein $\theta_1$ is defined by a relationship $$\theta_1(t) = \mathrm{atan}\left(\frac{y_1 - V_p t}{x_1 + X_C}\right),$$

wherein $\theta_1$ is dependent on time (t), t has a value between $-T/2$ and $T/2$, T is a duration of a flight of the SAR system while illuminating the scene, $X_C$ is a distance from the travel path of the SAR system to a center of the scene in the normal direction to the travel path, $x_1$ is a first distance value of a point in the scene alone the normal direction of the travel path with respect to the center of the scene, and $y_1$ is a second distance value of the point along a direction parallel to the travel path with respect to the center of the scene.

Clause 9. The method of clause 8, wherein the first ROI range ($r_1$) is defined by a relationship $$r_1(t) = \sqrt{(x_1 + X_C)^2 + (y_1 + V_p t)^2},$$

wherein $r_1$ is dependent on t.

Clause 10. The method of claim 9, wherein the component SAR phase history data is first component SAR phase history data, the ROI is a first ROI, the location of the first ROI is a first location, and the method further comprises: obtaining a second location of a second ROI within the scene; and extracting from the composite SAR phase history data a second component SAR phase history data corresponding to the second ROI at the location of the second ROI, wherein the second component SAR phase history data corresponds to a second sectoral SAR phase history data corresponding to a second sector of the plurality of the sectors, and the second sector corresponds to a second Doppler frequency interval, and wherein the Doppler processing the induced azimuth signal further includes determining a second Doppler frequency in the induced azimuth signal from the backscattered return signals received at a second directional angle ($\theta_2$) from the normal direction to the travel path, wherein the second Doppler frequency ($f_2$) is defined by a relationship $$f_2 = \frac{2V_p}{\lambda}\sin(\theta_2),$$

bandpass filtering the induced azimuth signal, with a bandpass filter having a passband, to produce a new induced azimuth signal that includes frequency components of the induced azimuth signal that fall within the passband, determining a second ROI range of the location of the second ROI from the SAR system within a second range interval within the scene, and truncating the second sectoral SAR phase history data to produce a trucked second sectoral SAR phase history data corresponding to the second sector and the range interval.

Clause 11. The method of clause 10, wherein the bandpass filtering includes bandpass filtering the induced azimuth signal between the first frequency value and the second frequency value of the second Doppler frequency interval.

Clause 12. The method of clause 10, wherein $\theta_2$ is defined by a relationship $$\theta_2(t) = \mathrm{atan}\left(\frac{y_2 - V_p t}{x_2 + X_C}\right),$$

wherein $\theta_2$ is dependent on t, $x_2$ is a third distance value of a second point in the scene alone the normal direction of the travel path with respect to the center of the scene, and $y_2$ is a fourth distance value of the second point along a direction parallel to the travel path with respect to the center of the scene and wherein the second ROI range ($r_2$) is defined by a relationship $$r_2(t) = \sqrt{(x_2 + X_C)^2 + (y_2 + V_p t)^2},$$

wherein $r_2$ is dependent on t.

Clause 13. The method of clause 1, 2, 3, 4, 5, 6, 7, 8, 9, 10, 11, or 12, wherein the obtaining the location of the ROI includes obtaining the location of the ROI via at least one of global positioning system (GPS) coordinates, a ground spotter, or a targeting system.

Clause 14. The method of clause 9, wherein the obtaining the location of the ROI includes: creating, from the component SAR phase history data, a pseudo-image of the scene; detecting salient features of energy in the pseudo-image; and detecting the ROI within the scene by generating a bounding ellipse around the detected salient features of energy.

Clause 15. The method of clause 14, wherein the detecting salient features comprises adaptive thresholding the pseudo-image to produce a binary image, and identifying an object in the binary image utilizing morphological operations with connected component labeling.

Clause 16. The method of clause 14 or 15, wherein the adaptive thresholding includes size thresholding to exclude small artifacts in the binary image.

Clause 17. The method of clause 14, 15, or 16, wherein the identifying the object further comprises generating, after the connected component labeling, a centroid, a major axis, a minor axis, and an orientation of the object, wherein the centroid, major axis, minor axis, and orientation of the object defines the bounding ellipse around the object.

Clause 18. The method of clause 14, 15, 16, or 17, wherein the detecting the ROI within the scene includes mapping an ellipse range value and an ellipse angle value of the bounding ellipse to the scene.

Clause 19. The method of clause 18, wherein the obtaining the location of the ROI further comprises determining the location of the ROI from the ellipse range value and the ellipse angle value.

Clause 20. An aerial vehicle adapted to perform the method of clause 1, the aerial vehicle comprising: a memory comprising a plurality of executable instructions; a SAR sensor within the SAR system; and one or more processing units adapted to execute the plurality of executable instructions to perform the method of claim 1.

Clause 21. A synthetic aperture radar (SAR) system for extraction of a region of interest (ROI) from a composite SAR phase history data, comprising: a memory; one or more processing units; and a machine-readable medium on the memory, wherein the machine-readable medium stores instructions that, when executed by the one or more processing units, cause the SAR system to perform operations comprising: receiving the composite SAR phase history data of a plurality of backscattered return signals produced as a function of the SAR system illuminating a scene with a SAR beam; obtaining a location of a ROI within the scene; and extracting from the composite SAR phase history data a component SAR phase history data corresponding to the ROI at the location of the ROI.

Clause 22. The SAR system of clause 21, further comprising inputting the component SAR phase history data to an automatic target recognition (ATR) engine.

Clause 23. The SAR system of clause 21, wherein the extracting the composite SAR phase history data comprises: sectorizing the SAR beam into a plurality of sectors, wherein each sector is defined between a first sectoral angle and a second sectoral angle and each sector corresponds to a Doppler frequency interval having a first frequency value and a second frequency value; and decomposing the composite SAR phase history data into a plurality of sectoral SAR phase history data via Doppler processing of an induced azimuth signal, wherein each sectoral SAR phase history data corresponds to a unique sector of the plurality of sectors, the component SAR phase history data corresponds to a first sectoral SAR phase history data corresponding to a first sector of the plurality of the sectors, and the first sector corresponds to a first Doppler frequency interval.

Clause 24. A method for region of interest (ROI) detection and localization with reduced synthetic aperture radar (SAR) phase history data, the method comprising: receiving, by a system comprising a processor, the SAR phase history data of a plurality of backscattered return signals produced in response to a SAR system illuminating a scene with a SAR beam; creating, from the plurality of backscattered return signals, a pseudo-image of a radar beam sector via angular decomposition, wherein the radar beam sector is a sector of the SAR beam; detecting salient features of energy in the pseudo-image; and detecting the ROI within the scene by generating a bounding ellipse around the detected salient features of energy.

Clause 25. The method of clause 24, wherein the detecting salient features comprises adaptive thresholding the pseudo-image to produce a binary image, and identifying an object in the binary image utilizing morphological operations with connected component labeling.

Clause 26. The method of clause 25, wherein the adaptive thresholding includes size thresholding to exclude small artifacts in the binary image.

Clause 27. The method of clause 25, wherein the identifying the object further comprises generating, after the connected component labeling, a centroid, a major axis, a minor axis, and an orientation of the object, wherein the centroid, major axis, minor axis, and orientation of the object defines the bounding ellipse around the object.

Clause 28. The method of clause 24, wherein the extracting a composite SAR phase history data comprises: sectorizing the SAR beam into a plurality of sectors, wherein each sector is defined between a first sectoral angle and a second sectoral angle and each sector corresponds to a Doppler frequency interval having a first frequency value and a second frequency value; and decomposing the composite SAR phase history data into a plurality of sectoral SAR phase history data via Doppler processing of an induced azimuth signal, wherein each sectoral SAR phase history data corresponds to a unique sector of the plurality of sectors, a first component SAR phase history data corresponds to a first sectoral SAR phase history data corresponding to a first sector of the plurality of the sectors, and the first sector corresponds to a first Doppler frequency interval.

Clause 29. The method of clause 28, wherein the induced azimuth signal is produced by storing the composite SAR phase history data in a two-dimensional data storage having a plurality of rows and a plurality of columns, wherein each row of the plurality of rows corresponds to a range value that is measured from a location of the SAR system to the location of a first ROI in a normal direction to a travel path of the SAR system and each column of the plurality of columns is arranged in a direction parallel to the direction of the travel path, and wherein each row comprises discrete signal samples of the range values from the composite SAR phase data and each column comprises the induced azimuth signal at a corresponding range value.

Clause 30. The method of clause 29, wherein the Doppler processing the induced azimuth signal includes determining a first Doppler frequency in the induced azimuth signal from the backscattered return signals received at a first directional angle ($\theta_1$) from the normal direction to the travel path, wherein the first Doppler frequency ($f_1$) is defined by a relationship $$f_1 = \frac{2V_p}{\lambda}\sin(\theta_1),$$

wherein $V_p$ is a SAR system velocity along the travel path and $\lambda$ is a wavelength of a carrier frequency of the SAR system, bandpass filtering the induced azimuth signal, with a bandpass filter having a passband, to produce a new induced azimuth signal that includes frequency components of the induced azimuth signal that fall within the passband.

Clause 31. The method of clause 30, wherein the bandpass filtering includes bandpass filtering the induced azimuth signal between the first frequency value and the second frequency value of the first Doppler frequency interval.

Clause 32. The method of clause 31, wherein the bandpass filtering includes bandpass filtering with Butterworth, elliptic, or Chebyshev filters.

It will be understood that various aspects or details of the disclosure can be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

It is claimed:

1. A method that extracts a region of interest (ROI) from composite synthetic aperture radar (SAR) phase history data, the method comprising:
receiving, by a SAR system, the composite SAR phase history data of a plurality of backscattered return signals produced as a result of the SAR system illuminating a scene with a SAR beam;
obtaining a location of a ROI within the scene; and
extracting from the composite SAR phase history data a component SAR phase history data corresponding to the ROI, wherein the component SAR phase history data is to be utilized for object detection;
wherein the extracting the composite SAR phase history data comprises: sectorizing the SAR beam into a plurality of sectors, wherein each sector is defined between a first sectoral angle and a second sectoral angle and each sector corresponds to a Doppler frequency interval having a first frequency value and a second frequency value; and
decomposing the composite SAR phase history data into a plurality of sectoral SAR phase history data via Doppler processing of an induced azimuth signal,
wherein each sectoral SAR phase history data corresponds to a unique sector of the plurality of sectors, the component SAR phase history data corresponds to a first sectoral SAR phase history data corresponding to a first sector of the plurality of the sectors, and the first sector corresponds to a first Doppler frequency interval;
wherein the Doppler processing of the induced azimuth signal includes:
determining a first Doppler frequency in the induced azimuth signal from the backscattered return signals received at a first directional angle ($\theta_1$) from the normal direction to the travel path, wherein the first Doppler frequency ($f_1$) is defined by the first directional angle, a velocity of the SAR system along the travel path and a wavelength of a carrier frequency of the SAR system, and
bandpass filtering the induced azimuth signal, with a bandpass filter having a passband, to produce a new induced azimuth signal that includes frequency components of the induced azimuth signal that fall within the passband.

2. The method of claim 1, further comprising:
determining a magnitude of each of a subset of the plurality of sectoral SAR phase history data;
adding the magnitudes to obtain a pseudo-image, wherein each magnitude is added to its corresponding location in the pseudo-image; and
detecting the ROI in the pseudo-image.

3. The method of claim 1, wherein the method comprises producing the induced azimuth signal, wherein producing the induced azimuth signal comprises:
storing the composite SAR phase history data in a two-dimensional data storage having a plurality of rows and a plurality of columns,
wherein each row of the plurality of rows corresponds to a range value that is measured from a location of the SAR system to the location of the ROI in a normal direction to a travel path of the SAR system and each column of the plurality of columns corresponds to a direction parallel to the direction of the travel path, and
wherein each row comprises discrete signal samples of the range values from the composite SAR phase data and each column comprises the induced azimuth signal at a corresponding range value;
wherein the first Doppler frequency ($f_1$) is defined by a relationship $$f_1 = \frac{2V_p}{\lambda}\sin(\theta_1),$$

wherein $V_p$ is the velocity of the SAR system along the travel path and i is the wavelength of the carrier frequency of the SAR system.

4. The method of claim 3, wherein the extracting the composite SAR phase history data further comprises:
determining a first ROI range of the location of the ROI from the SAR system within a range interval within the scene, and
truncating the first sectoral SAR phase history data to produce a trucked first sectoral SAR phase history data corresponding to the first sector and the range interval.

5. The method of claim 4, wherein the bandpass filtering includes bandpass filtering the induced azimuth signal between the first frequency value and the second frequency value of the first Doppler frequency interval.

6. The method of claim 4, wherein $\theta_1$ is defined by a relationship $$\theta_1(t) = \mathrm{atan}\!\left(\frac{y_1 - V_p t}{x_1 + X_C}\right),$$

wherein $\theta_1$ is dependent on time (t), t has a value between $-T/2$ and $T/2$, T is a duration of a flight of the SAR system while illuminating the scene, $X_c$ is a distance from the travel path of the SAR system to a center of the scene in the normal direction to the travel path, $x_1$ is a first distance value of a point in the scene along the normal direction of the travel path with respect to the center of the scene, and $y_1$ is a second distance value of the point along a direction parallel to the travel path with respect to the center of the scene.

7. The method of claim 6, wherein the first ROI range ($r_1$) is defined by a relationship $$r_1(t) = \sqrt{(x_1 + X_C)^2 + (y_1 + V_p t)^2},$$

wherein n is dependent on t.

8. The method of claim 7, wherein the component SAR phase history data is a first component SAR phase history data, the ROI is a first ROI, the location of the first ROI is a first location, and the method further comprises:
   obtaining a second location of a second ROI within the scene; and
   extracting from the composite SAR phase history data a second component SAR phase history data corresponding to the second ROI at the location of the second ROI,
   wherein the second component SAR phase history data corresponds to a second sectoral SAR phase history data corresponding to a second sector of the plurality of sectors, and the second sector corresponds to a second Doppler frequency interval, and
   wherein the Doppler processing the induced azimuth signal further includes:
      determining a second Doppler frequency in the induced azimuth signal from
   the backscattered return signals received at a second directional angle ($\theta_2$) from the normal direction to the travel path, wherein the second Doppler frequency ($f_2$) is defined by a relationship $$f_2 = \frac{2V_p}{\lambda}\sin(\theta_2),$$

bandpass filtering the induced azimuth signal, with a bandpass filter having a passband, to produce a new induced azimuth signal that includes frequency components of the induced azimuth signal that fall within the passband,
   determining a second ROI range of the location of the second ROI from the SAR system within a second range interval within the scene, and
   truncating the second sectoral SAR phase history data to produce a trucked second sectoral SAR phase history data corresponding to the second sector and the range interval.

9. The method of claim 8,
wherein $\theta_2$ is defined by a relationship $$\theta_2(t) = \operatorname{atan}\left(\frac{y_2 - V_p t}{x_2 + X_C}\right),$$

wherein $\theta_2$ is dependent on t, $x_2$ is a third distance value of a second point in the scene along the normal direction of the travel path with respect to the center of the scene, and $y_2$ is a fourth distance value of the second point along a direction parallel to the travel path with respect to the center of the scene and
wherein the second ROI range ($r_2$) is defined by a relationship $$r_2(t) = \sqrt{(x_2 + X_C)^2 + (y_2 + V_p t)^2},$$

wherein $r_2$ is dependent on t.

10. The method of claim 7, wherein the obtaining the location of the ROI includes:
   creating, from the component SAR phase history data, a pseudo-image of the scene;
   detecting salient features of energy in the pseudo-image; and
   detecting the ROI within the scene by generating a bounding ellipse around the detected salient features of energy,
   wherein the detecting salient features comprises:
      adaptive thresholding the pseudo-image to produce a binary image, and
      identifying an object in the binary image utilizing morphological operations with connected component labeling.

11. The method of claim 10, wherein the adaptive thresholding includes size thresholding to exclude small artifacts in the binary image.

12. The method of claim 10, wherein the identifying the object further comprises:
   generating, after the connected component labeling, a centroid, a major axis, a minor axis, and an orientation of the object,
   wherein the centroid, major axis, minor axis, and orientation of the object defines the bounding ellipse around the object,
   wherein the detecting the ROI within the scene includes mapping an ellipse range value and an ellipse angle value of the bounding ellipse to the scene, and
   wherein the obtaining the location of the ROI further comprises determining the location of the ROI from the ellipse range value and the ellipse angle value.

13. A synthetic aperture radar (SAR) system for extraction of a region of interest (ROI) from a composite SAR phase history data, comprising:
   a memory;
   one or more processing units; and
   a machine-readable medium on the memory, wherein the machine-readable medium stores instructions that, when executed by the one or more processing units, cause the SAR system to perform operations comprising:
      receiving the composite SAR phase history data of a plurality of backscattered return signals produced as a function of the SAR system illuminating a scene with a SAR beam;
      obtaining a location of a ROI within the scene; and
      extracting from the composite SAR phase history data a component SAR phase history data corresponding to the ROI at the location of the ROI;
   wherein the extracting the composite SAR phase history data comprises:
      sectorizing the SAR beam into a plurality of sectors, wherein each sector is defined between a first sectoral angle and a second sectoral angle and each sector corresponds to a Doppler frequency interval having a first frequency value and a second frequency value; and
      decomposing the composite SAR phase history data into a plurality of sectoral SAR phase history data via Doppler processing of an induced azimuth signal,
      wherein each sectoral SAR phase history data corresponds to a unique sector of the plurality of sectors, the component SAR phase history data corresponds to a first sectoral SAR phase history data corresponding to a first sector of the plurality of the sectors, and the first sector corresponds to a first Doppler frequency interval;

wherein the Doppler processing the induced azimuth signal includes:

determining a first Doppler frequency in the induced azimuth signal from the backscattered return signals received at a first directional angle ($\theta_1$) from the normal direction to the travel path, wherein the first Doppler frequency ($f_1$) is defined by the first directional angle, a velocity of the SAR system along the travel path and a wavelength of a carrier frequency of the SAR system, and bandpass filtering the induced azimuth signal, with a bandpass filter having a passband, to produce a new induced azimuth signal that includes frequency components of the induced azimuth signal that fall within the passband.

14. The SAR system of claim 13, wherein the operations further comprise:

determining a magnitude of each of a subset of the plurality of sectoral SAR phase history data;

adding the magnitudes to obtain a pseudo-image, wherein each magnitude is added to its corresponding location in the pseudo-image; and detecting the ROI in the pseudo-image;

wherein the magnitudes are determined as magnitudes of backscattered return quadrature I/Q signal representations.

15. The SAR system of claim 13, wherein the operations further comprise producing the induced azimuth signal, including storing the composite SAR phase history data in a two-dimensional data storage having a plurality of rows and a plurality of columns.

16. The SAR system of claim 13, wherein the first Doppler frequency ($f_1$) is defined by a relationship $$f_1 = \frac{2V_p}{\lambda}\sin(\theta_1),$$

wherein $V_p$ is the velocity of the SAR system along the travel path and $\lambda$ is the wavelength of the carrier frequency of the SAR system.

17. A method for region of interest (ROI) detection and localization with synthetic aperture radar (SAR) phase history data, the method comprising:

receiving, by a system comprising a processor, the SAR phase history data of a plurality of backscattered return signals produced in response to a SAR system illuminating a scene with a SAR beam;

creating, from a subset of the plurality of backscattered return signals, a pseudo-image of the scene via angular decomposition, the pseudo-image having a lower resolution than a full image of the scene, the full image being defined by, and obtainable using, the subset and one or more additional backscattered return signals of the plurality of backscattered return signals, the subset being smaller than needed for the full image reconstruction;

detecting salient features of energy in the pseudo-image, including:

adaptive thresholding the pseudo-image to produce a binary image, and, identifying an object in the binary image utilizing morphological operations with connected component labeling, wherein identifying the object includes generating after the connected component labeling a centroid, a major axis, a minor axis, and an orientation of the object, wherein the centroid, major axis, minor axis, and orientation of the object define a bounding ellipse around the object, wherein magnitudes of the subset of the plurality of backscattered return signals are determined as magnitudes of backscattered return-quadrature I/Q signal representations; and detecting the ROI within the scene from the detected salient features of energy;

wherein the creating the pseudo-image comprises adding magnitudes of the subset of backscattered return signal representations, wherein each magnitude is added to its corresponding location in the pseudo-image.

18. The method of claim 15, wherein the adaptive thresholding includes size thresholding to exclude small artifacts in the binary image.

19. The method of claim 17, further comprising extracting from a composite SAR phase history data a component SAR phase history data corresponding to the ROI, wherein the extracting comprises:

sectorizing the SAR beam into a plurality of sectors, wherein each sector is defined between a first sectoral angle and a second sectoral angle and each sector corresponds to a Doppler frequency interval having a first frequency value and a second frequency value; and decomposing the composite SAR phase history data into a plurality of sectoral SAR phase history data via Doppler processing of an induced azimuth signal, wherein each sectoral SAR phase history data corresponds to a unique sector of the plurality of sectors, a first component SAR phase history data corresponds to a first sectoral SAR phase history data corresponding to a first sector of the plurality of the sectors, and the first sector corresponds to a first Doppler frequency interval.

20. The method of claim 19, wherein the induced azimuth signal is produced by:

storing the composite SAR phase history data in a two-dimensional data storage having a plurality of rows and a plurality of columns, wherein each row of the plurality of rows corresponds to a range value that is measured from a location of the SAR system to the location of a first ROI in a normal direction to a travel path of the SAR system and each column of the plurality of columns is arranged in a direction parallel to the direction of the travel path, wherein each row comprises discrete signal samples of the range values from the composite SAR phase data and each column comprises the induced azimuth signal at a corresponding range value, and wherein the Doppler processing the induced azimuth signal includes determining a first Doppler frequency in the induced azimuth signal from the backscattered return signals received at a first directional angle ($\theta_1$) from the normal direction to the travel path, wherein the first Doppler frequency ($f_1$) is defined by a relationship $$f_1 = \frac{2V_p}{\lambda}\sin(\theta_1),$$

wherein Vp is a SAR system velocity along the travel path and i is a wavelength of a carrier frequency of the SAR system; and bandpass filtering the induced azimuth signal, with a bandpass filter having a passband, to produce a new induced azimuth signal that includes frequency components of the induced azimuth signal that fall within the passband.

\* \* \* \* \*